US011521005B2

(12) United States Patent
Lin et al.

(10) Patent No.: US 11,521,005 B2
(45) Date of Patent: Dec. 6, 2022

(54) CONTAINERS, PACKAGES, PRODUCTION SYSTEMS, AND DISTRIBUTION SYSTEMS

(71) Applicant: TCI CO., LTD., Taipei (TW)

(72) Inventors: Yung-Hsiang Lin, Taipei (TW); Min Yue, Taipei (TW); Hsing-I Wang, Taipei (TW); Tsung Jung Chen, Taipei (TW)

(73) Assignee: TCI CO., LTD., Taipei (TW)

( * ) Notice: Subject to any disclaimer, the term of this patent is extended or adjusted under 35 U.S.C. 154(b) by 0 days.

(21) Appl. No.: 17/110,169

(22) Filed: Dec. 2, 2020

(65) Prior Publication Data

US 2021/0224498 A1 Jul. 22, 2021

Related U.S. Application Data

(60) Provisional application No. 62/987,704, filed on Mar. 10, 2020, provisional application No. 62/950,601, filed on Dec. 19, 2019.

(51) Int. Cl.
  *G06K 7/14* (2006.01)
  *G06K 19/06* (2006.01)
  *B65D 23/00* (2006.01)
(52) U.S. Cl.
  CPC ........... *G06K 7/1439* (2013.01); *B65D 23/00* (2013.01); *G06K 19/06009* (2013.01)
(58) Field of Classification Search
  CPC . G06K 7/1408; G06K 19/06009; B65D 23/00
  (Continued)

(56) References Cited

U.S. PATENT DOCUMENTS

| 2013/0246136 A1* | 9/2013 | Ramsey | G06Q 30/0643 |
| | | | 705/14.12 |
| 2014/0014714 A1* | 1/2014 | Tang | B65D 25/205 |
| | | | 235/375 |
| 2019/0009942 A1* | 1/2019 | Hermans | B65B 61/025 |

FOREIGN PATENT DOCUMENTS

| CN | 104340446 B | 4/2017 |
| CN | 207208848 U | 4/2018 |

(Continued)

OTHER PUBLICATIONS

Rejection Decision dated Nov 8, 2021 in Taiwan Patent Application No. 109142204.

(Continued)

*Primary Examiner* — Toan C Ly
(74) *Attorney, Agent, or Firm* — Prosyla Group PC

(57) ABSTRACT

The present invention relates to a container, a package, a production system, and a distribution system. The container comprises a first identification and a second identification. The first identification is unique for identifying the container and is not exposed. The second identification is unique for identifying the container and is accessible. The second identification is different from the first identification. The second identification is associated with the first identification. The distribution system comprises a processor and a memory. The memory includes instructions causing the processor to perform operations. The operations include: inputting a first identification and a second identification of a first container, wherein the first identification and the second identification are different from each other and are unique for identifying the first container, the first identification is not exposed, and the second identification is accessible; and associating the second identification and the first identification.

20 Claims, 22 Drawing Sheets

(58) Field of Classification Search
USPC .......................................................... 235/385
See application file for complete search history.

(56) References Cited

FOREIGN PATENT DOCUMENTS

| | | |
|---|---|---|
| CN | 208102814 U | 11/2018 |
| CN | 110291015 A | 9/2019 |
| TW | 201132555 A | 10/2011 |

OTHER PUBLICATIONS

Rejection Decision dated Nov. 9, 2021 in Taiwan Patent Application No. 109142205.
Office Action issued in Taiwan Patent Application No. 109142204 dated Jul. 22, 2021.
Office Action issued in Taiwan Patent Application No. 109142205 dated Jul. 23, 2021.
Office Action issued in Taiwan Patent Application No. 109144553 dated Aug. 30, 2021.

* cited by examiner

300

1000

CONTAINERS, PACKAGES, PRODUCTION SYSTEMS, AND DISTRIBUTION SYSTEMS

This application claims priority to and benefit of U.S. Provisional Patent Application No. 62/950,601, filed Dec. 19, 2019, and U.S. Provisional Patent Application No. 62/987,704, filed Mar. 10, 2020, the contents of which are incorporated by reference herewith in their entirety.

BACKGROUND OF THE INVENTION

1. Field of the Invention

The present invention relates to a container, package, production system, and distribution system for a product, and more particularly to a container and package with identification and a corresponding production system and a corresponding distribution system.

2. Description of the Related Art

Due to product safety issues in recent years, consumer awareness of food safety has increased. Some consider that food safety will be ensured if consumers understood what food is made from. Food companies have begun to provide product information for consumer review. Consumers may check traceability information for a product by scanning identification printed on the product. In conventional techniques, identical information or identification is printed on containers of the same product. However, the actual product in individual containers may originate in different sources or factories and comprise contents from different suppliers.

SUMMARY OF THE INVENTION

The present disclosure provides a container and package for a novel distribution system. Through unique identification on the container, consumers can access traceability information for the contents. Furthermore, additional information such as verification information, supply chain information, and price information, may be further provided through the identifications on the container and the package.

Some embodiments of the present disclosure provide a container comprising a first identification and a second identification. The first identification is unique for identifying the container and is not exposed. The second identification is unique for identifying the container and is accessible. The second identification is different from the first identification. The second identification is associated with the first identification.

Other embodiments of the present disclosure provide a product package, comprising a first package and a first container. The first package includes a first identification. The first identification is unique for identifying the first package. The first container is disposed in the first package. The first container includes a second identification. The second identification is unique for identifying the first container. The first identification is associated with the second identification.

More embodiments of the present disclosure provide a distribution system comprising: a processor and a memory. The memory includes instructions causing the processor to perform operations. The operations include: inputting a first identification and a second identification of a first container, wherein the first identification and the second identification are different from each other and are unique for identifying the first container, the first identification is not exposed, and the second identification is accessible; and associating the second identification and the first identification.

BRIEF DESCRIPTION OF THE DRAWINGS

The aspects of the present invention will become more comprehensible from the following detailed description made with reference to the accompanying drawings. It should be noted that, various features may not be drawn to scale. Actually, the sizes of the various features may be increased or reduced arbitrarily for the purpose of clear description.

PREFERRED EMBODIMENT OF THE PRESENT INVENTION

Figure 1:
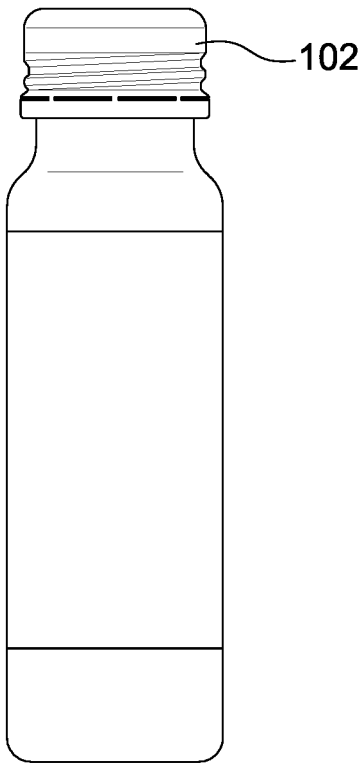
FIG. 1 is a schematic view of a container according to one embodiment of the present disclosure.

The following disclosure provides many different embodiments or examples for implementing different features of the provided subject matter. Specific examples of components and arrangements are described below. Certainly, these descriptions are merely examples and are not intended to be limiting. In the present disclosure, in the following descriptions, the description of the first feature being formed on or above the second feature may include an embodiment formed by direct contact between the first feature and the second feature, and may further include an embodiment in which an additional feature may be formed between the first feature and the second feature to enable the first feature and the second feature to be not in direct contact. In addition, in the present disclosure, reference numerals and/or letters may be repeated in examples. This repetition is for the purpose of simplification and clarity, and does not indicate a relationship between the described various embodiments and/or configurations.

The embodiments of the present disclosure are described in detail below. However, it should be understood that many applicable concepts provided by the present disclosure may be implemented in a plurality of specific environments. The described specific embodiments are only illustrative and do not limit the scope of the present invention.

FIG. 1 is a schematic view of a container 100 according to one embodiment of the present disclosure. In some embodiments, the container 100 may be a bottle. The container 100 may be made of glass or plastic. The container 100 of FIG. 1 includes a lid 102. The lid can also be referred to a cap in the present disclosure. The lid 102 may cover the opening of the container 100. The lid 102 may seal the container 100 to secure the content in the container 100.

Figure 2A:
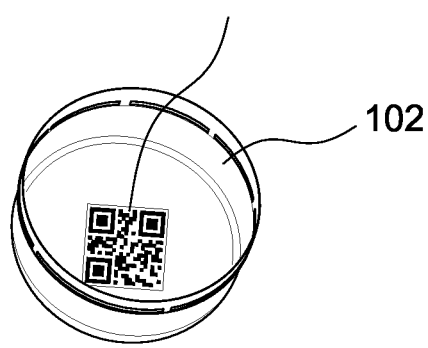
FIGS. 2A and 2B are schematic views of a lid according to another embodiment of the present disclosure.
Figure 2B:
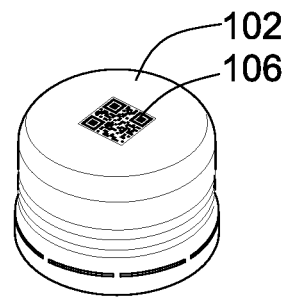

FIGS. 2A and 2B are schematic views of a lid 102 according to another embodiment of the present invention. FIG. 2A illustrates a first angle of the lid 102, in which an inner surface of the lid 102 is shown. When the lid 102 is screwed, attached, or secured to the container 100, the inner surface of the lid 102 may be in contact with the content stored in the container 100. When the lid 102 is screwed, attached, or secured to the container 100, the inner surface of the lid 102 is not exposed to air, consumers, or other people.

The lid 102 includes an identification 104. The identification 104 may be printed on the inner surface of the lid 102. When the lid 102 is screwed, attached, or secured to the container 100, the identification 104 is neither exposed to air nor accessible (or touchable) to consumers and other people. When the lid 102 is screwed, attached, or secured to the container 100, the identification 104 is enclosed within the container 100. In some embodiments, the identification 104 cannot be seen from the exterior of the container 100 or the lid 102 after the lid 102 is screwed, attached, or secured to the container 100.

The identification 104 may be a QR (Quick Response) code, a barcode, a serial number, or other formats of information. The identification 104 may be in contact with the content stored in the container 100. The identification 104 may be printed with an edible pigment. The identification 104 may be printed with a human-safe pigment.

The identification 104 may be printed with a visible pigment. The identification 104 may be visible for human eyes. The identification 104 may be printed with an invisible pigment. The identification 104 may be invisible for human eyes. The identification 104 may be invisible for human eyes under the visible light. In some embodiments, the invisible pigment for printing the identification 104 may be visible when the invisible pigment is illuminated by an infrared light or an ultraviolet light.

The identification 104 may be unique for identifying the container 100. A specific identification 104 may be unique for identifying a specific container 100.

FIG. 2B illustrates a second angle of the lid 102, in which an outer surface of the lid 102 is shown. When the lid 102 is screwed, attached, or secured to the container 100, the outer surface of the lid 102 may be exposed to air, consumers, and other people. The lid 102 includes an identification 106. The identification 106 may be printed on the outer surface of the lid 102. When the lid 102 is screwed, attached, or secured to the container 100, the identification 106 may be exposed to air and may be accessible to consumers and other people. In some embodiments, the identification 106 can be seen from the exterior of the lid 102 after the lid 102 is screwed, attached, or secured to the container 100.

The identification 106 may be a QR code, a barcode, a serial number, or other formats of information. The identification 106 may be printed with an edible pigment. The identification 106 may be printed with a human-safe pigment.

The identification 106 may be printed with a visible pigment. The identification 106 may be visible for human eyes. The identification 106 may be printed with an invisible pigment. The identification 106 may be invisible for human eyes. The identification 106 may be invisible for human eyes under the visible light. In some embodiments, the invisible pigment for printing the identification 106 may be visible when the invisible pigment is illuminated by an infrared light or an ultraviolet light. When the identification 106 is printed with an invisible pigment, another pattern (e.g., a logotype of the company producing or selling this product) can be also printed on the outer surface of the lid 102.

The identification 106 may be unique for identifying the container 100. A specific identification 106 may be unique for identifying a specific container 100.

The identification 104 is associated with the product information of the content of the container 100. The product information may include manufacturer information, company information, verification information, traceability information, supply chain information, price information, sale information, and other information for consumers or for product management. In some embodiments, the supply chain information includes one of the factory, the distributor, the wholesaler, and the retailer.

The identification 104 may be input into an electronic device (e.g., a personal digital assistant, a mobile phone, or a computer) by any one of a camera, an optical scanner, an infrared camera, or an ultraviolet camera. Upon the identification 104 is input into an electronic device (e.g., by a consumer or an employee), whereupon the electronic device outputs the corresponding product information of the content in the container 100. For example, when a consumer looks up the product information through a browser of a mobile phone, only consumer-related information (e.g., sale information and traceability information) would be output. In another example, when an employee looks up the product information through a specific software, all product information would be output.

The identification 106 is associated with the identification 104. The identification 106 may be input into an electronic device by any one of a camera, an optical scanner, an infrared camera, or an ultraviolet camera. Upon the identification 106 is input into an electronic device, whereupon the electronic device outputs the corresponding product information of the content in the container 100. In particular, when the identification 106 is input, a backend system recognizes that the identification 106 is associated with the identification 104 and retrieves the corresponding product information associated with the identification 104 for the electronic device's output accordingly. The method of looking up the product information and the method of associating identification are detailed as follows.

Figure 3:
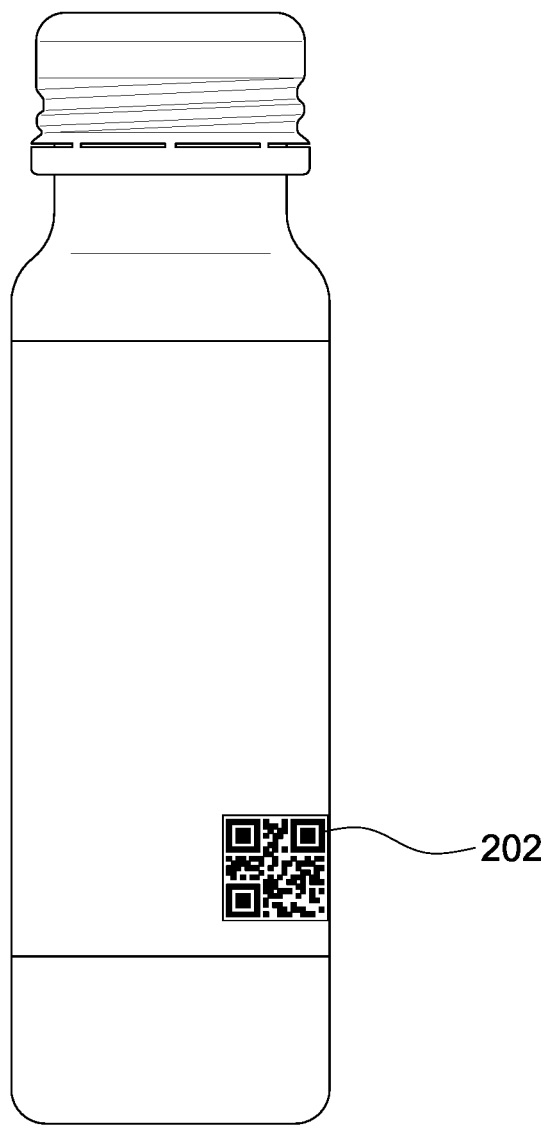
FIG. 3 is a schematic view of a container according to one embodiment of the present disclosure.

FIG. 3 is a schematic view of a container 200 according to one embodiment of the present disclosure. In some embodiments, the container 200 may be a bottle. The container 200 may be made of glass or plastic. The container 200 includes a lid.

Unlike the container 100 shown in FIG. 1, the container 200 shown in FIG. 3 includes an identification 202. The identification 202 may be printed on outer surface the container 200. The identification 202 may be printed on a label on the outer surface of the container 200. The identification 202 may be unique for identifying the container 200. A specific identification 202 may be unique for identifying a specific container 200.

In some embodiments of FIG. 3, an identification may not be printed on the outer surface of the lid. In some embodiments of FIG. 3, an identification 106 may be printed on the inner surface of the lid. In some embodiments of FIG. 3, an identification which is not exposed to air or consumers may be printed on the inner surface of the container 200. In some embodiments of FIG. 3, an identification which is not exposed to air or consumers may be printed on the inner surface of the label of the container 200.

Figure 4A:
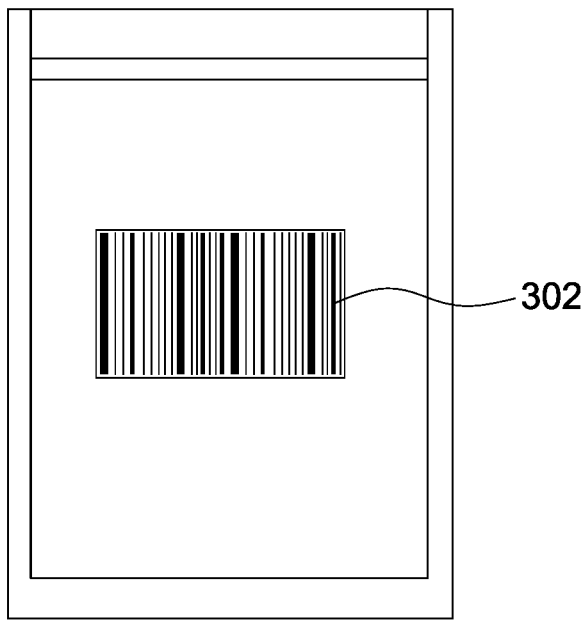
FIGS. 4A and 4B are schematic views of a container according to one embodiment of the present disclosure.
Figure 4B:
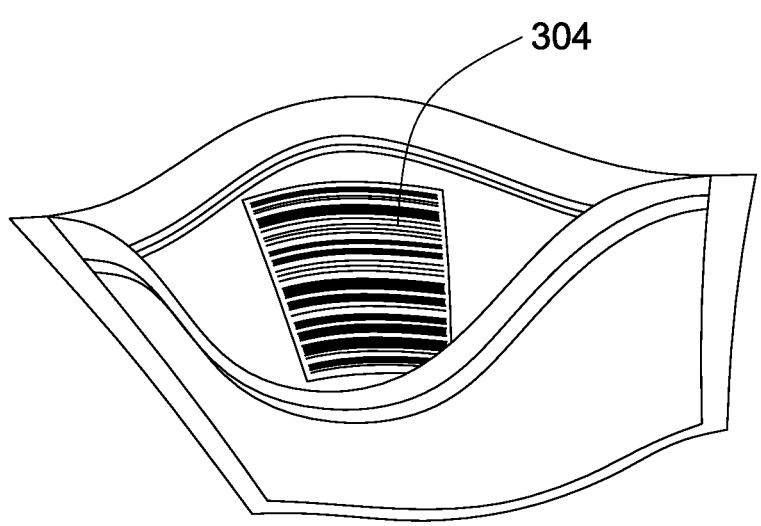

FIGS. 4A and 4B are schematic views of a container 300 according to one embodiment of the present disclosure. In some embodiments, the container 300 may be a soft container. In some embodiments, the container 300 may be a bag. The container 300 may be made of metal or plastic.

FIG. 4A shows an outer surface of the container 300. When the container 300 is sealed, the outer surface may be exposed to air, consumers, or other people. The container 300 includes an identification 302. The identification 302 may be printed on the outer surface of the container 300. When the container 300 is sealed, the identification 302 may be exposed to air and may be accessible to consumers and other people. When the container 300 is sealed, the identification 302 can be seen from the exterior of the container 300.

The identification 302 may be a QR code, a barcode, a serial number, or other formats of information. The identification 302 may be printed with a visible pigment. The identification 302 may be visible for human eyes. The identification 302 may be printed with an invisible pigment. The identification 302 may be invisible for human eyes. The identification 302 may be invisible for human eyes under the visible light. In some embodiments, the invisible pigment for printing the identification 302 may be visible when the invisible pigment is illuminated by an infrared light or an ultraviolet light. When the identification 302 is printed with an invisible pigment, another pattern (e.g., a logotype of the company producing or selling this product) can also be printed on the outer surface of the lid 102.

The identification 302 may be unique for identifying the container 300. A specific identification 302 may be unique for identifying a specific container 300.

FIG. 4B shows an inner surface of the container 300. The inner surface of the container 300 may be in contact with the content stored in the container 300. When the container 300 is sealed, the inner surface of the container 300 is not exposed to air, consumers, or other people. The container 300 includes an identification 304. The identification 304 may be printed on the inner surface of the container 300. When the container 300 is sealed, the identification 304 is neither exposed to air nor accessible to consumers and other people. When the container 300 is sealed, the identification 304 is enclosed within the container 300. When the container 300 is sealed, the identification 304 cannot be seen from the exterior of the container 300.

The identification 304 may be a QR code, a barcode, a serial number, or other formats of information. The identification 304 may be in contact with the content stored in the container 300. The identification 304 may be printed with a visible pigment. The identification 304 may be visible for human eyes. The identification 304 may be printed with an invisible pigment. The identification 304 may be invisible for human eyes. The identification 304 may be invisible for human eyes under the visible light. In some embodiments, the identification 304 may be printed with an invisible pigment which would be visible when illuminated by an infrared light or an ultraviolet light.

The identification 304 may be unique for identifying the container 300. A specific identification 304 may be unique for identifying a specific container 300.

The identification 304 is associated with the product information of the content in the container 300. Once a consumer or an employee inputs the identification 304 into an electronic device (e.g., a personal digital assistant, a mobile phone, or a computer), the electronic device will output the corresponding product information of the content in the container 300.

The identification 302 is associated with the identification 304. Upon a consumer or an employee inputs the identification 302 into an electronic device, whereupon the electronic device outputs product information corresponding to the content in the container 300. In particular, when the identification 302 is input, a backend system recognizes that the identification 302 is associated with the identification 304 and retrieves the corresponding product information associated with the identification 304 for the electronic device's output accordingly.

Figure 5:
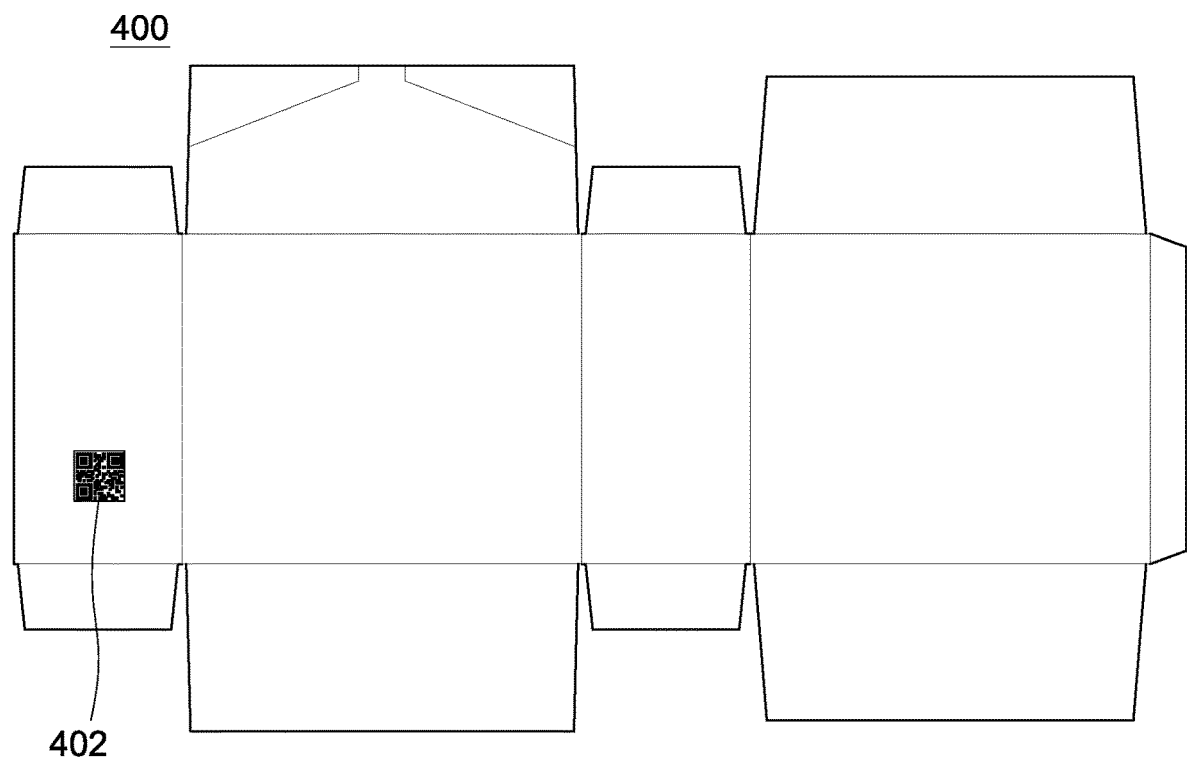
FIG. 5 is a schematic view of a package according to one embodiment of the present disclosure.

FIG. 5 is a schematic view of a package 400 according to one embodiment of the present disclosure. One container 100 may be disposed in one package 400. Two or more containers 100 may be disposed in one package 400. The package 400 includes an identification 402. The identification 402 may be unique for identifying the package 400. A specific identification 402 may be unique for identifying a specific package 400. The identification 402 is associated with the identification 106 of the container 100 which is disposed in the package 400. In some embodiments, the identification 402 of a specific package 400 is associated with the identification 106 of a specific container 100. In some embodiments, the association between the identification 402 of the specific package 400 and the identification 106 of the specific container 100 may indicate that the specific container 100 is disposed in the specific package 400.

Figure 6:
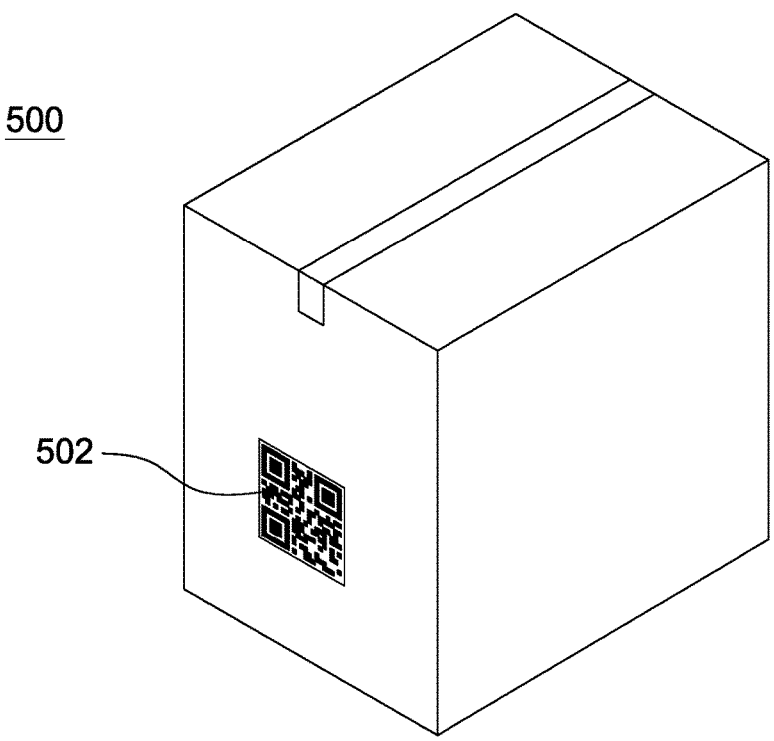
FIG. 6 is a schematic view of a package according to one embodiment of the present disclosure.

FIG. 6 is a schematic view of a package 500 according to one embodiment of the present disclosure. Several (e.g., six) packages 400 may be disposed in one package 500. The package 500 includes an identification 502. The identification 502 may be unique for identifying the package 500. A specific identification 502 may be unique for identifying a specific package 500. The identification 502 is associated with the identification 402 of the package 400 which is disposed in the package 500. In some embodiments, the identification 502 of a specific package 500 is associated with six identifications 402 of six specific packages 400. In some embodiments, the association between the identification 502 of the specific package 500 and the identification 402 of six specific packages 400 may indicate that the six specific packages 400 are disposed in the specific package 500.

Figure 7A:
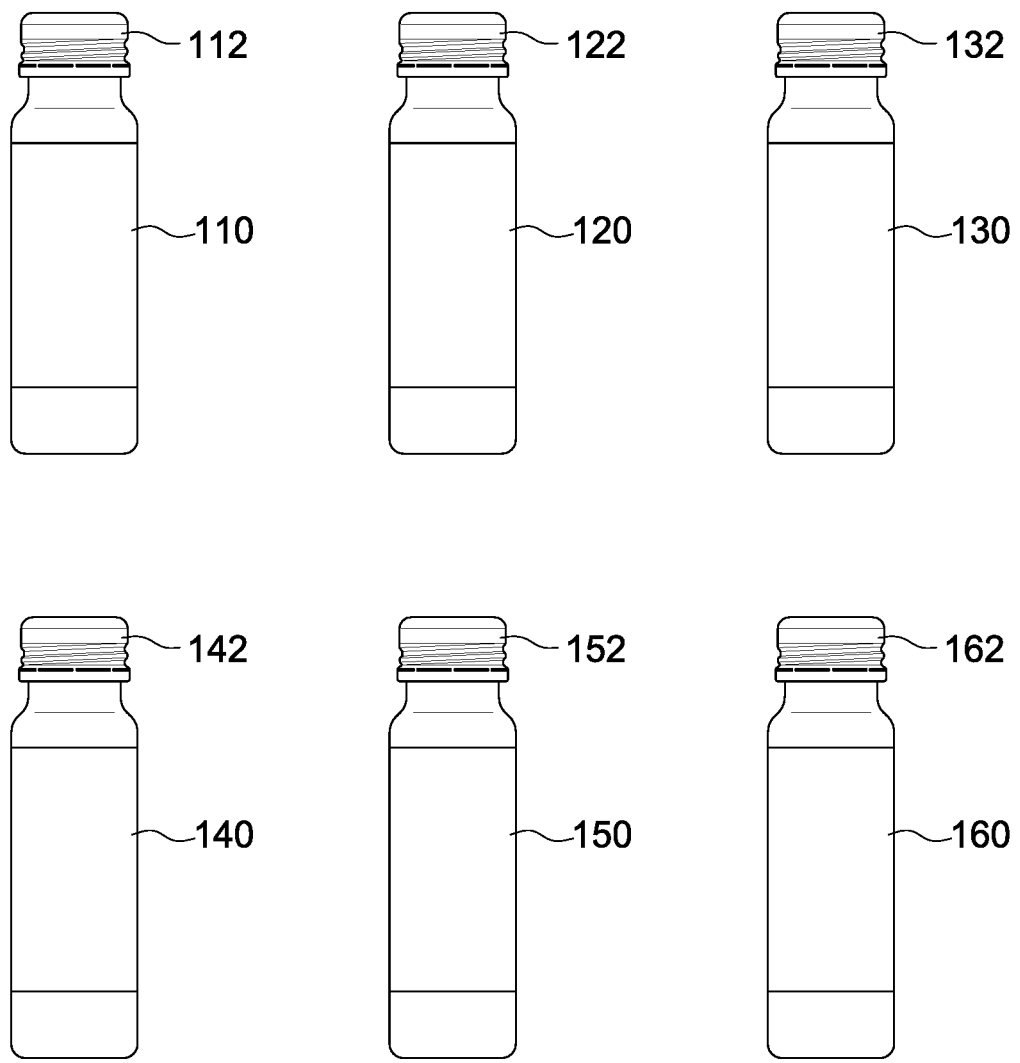
FIG. 7A shows containers according to one embodiment of the present disclosure.

FIG. 7A shows six containers 110, 120, 130, 140, 150, and 160 according to one embodiment of the present disclosure. The containers 110, 120, 130, 140, 150, and 160 include lids 112, 122, 132, 142, 152, and 162, respectively.

Figure 7B:
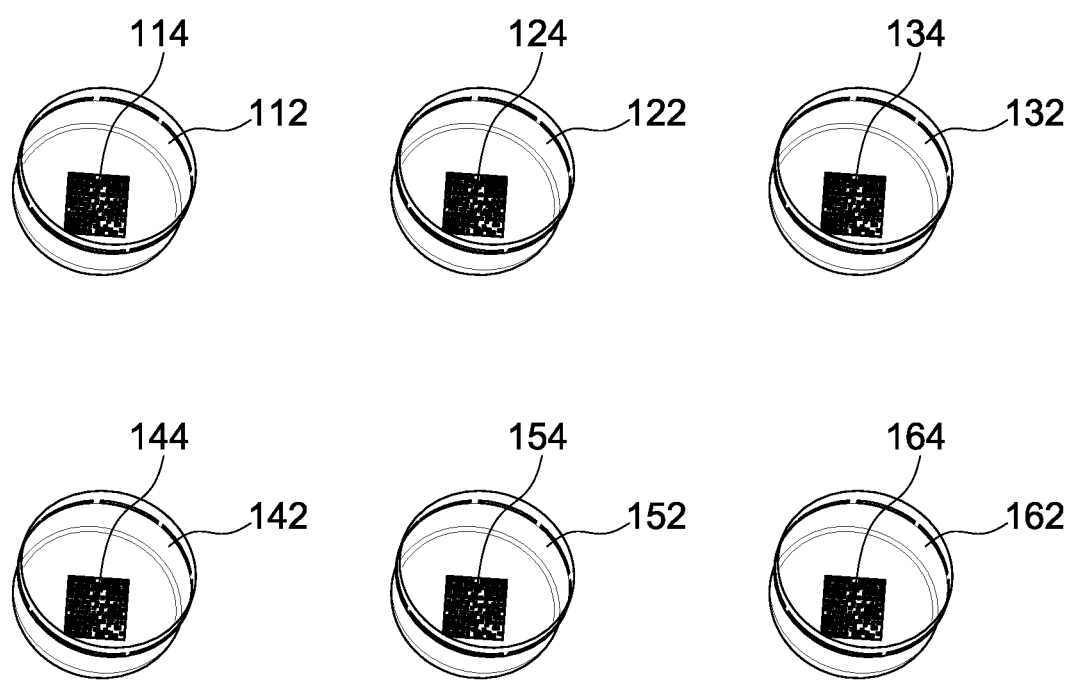
FIGS. 7B and 7C show lids according to one embodiment of the present disclosure.

FIG. 7B shows the inner surface of the lids 112, 122, 132, 142, 152, and 162 according to one embodiment of the present disclosure. The container 110 includes an identification 114 printed on the inner surface of the lid 112. The container 120 includes an identification 124 printed on the inner surface of the lid 122. The container 130 includes an identification 134 printed on the inner surface of the lid 132. The container 140 includes an identification 144 printed on the inner surface of the lid 142. The container 150 includes an identification 154 printed on the inner surface of the lid 152. The container 160 includes an identification 164 printed on the inner surface of the lid 162.

The identification 114 is unique for identifying the container 110. The identification 124 is unique for identifying the container 120. The identification 134 is unique for identifying the container 130. The identification 144 is unique for identifying the container 140. The identification 154 is unique for identifying the container 150. The identification 164 is unique for identifying the container 160.

The identification 114 is associated with the product information of the content stored in the container 110. The identification 124 is associated with the product information of the content stored in the container 120. The identification 134 is associated with the product information of the content stored in the container 130. The identification 144 is associated with the product information of the content stored in the container 140. The identification 154 is associated with the product information of the content stored in the container 150. The identification 164 is associated with the product information of the content stored in the container 160.

Figure 7C:
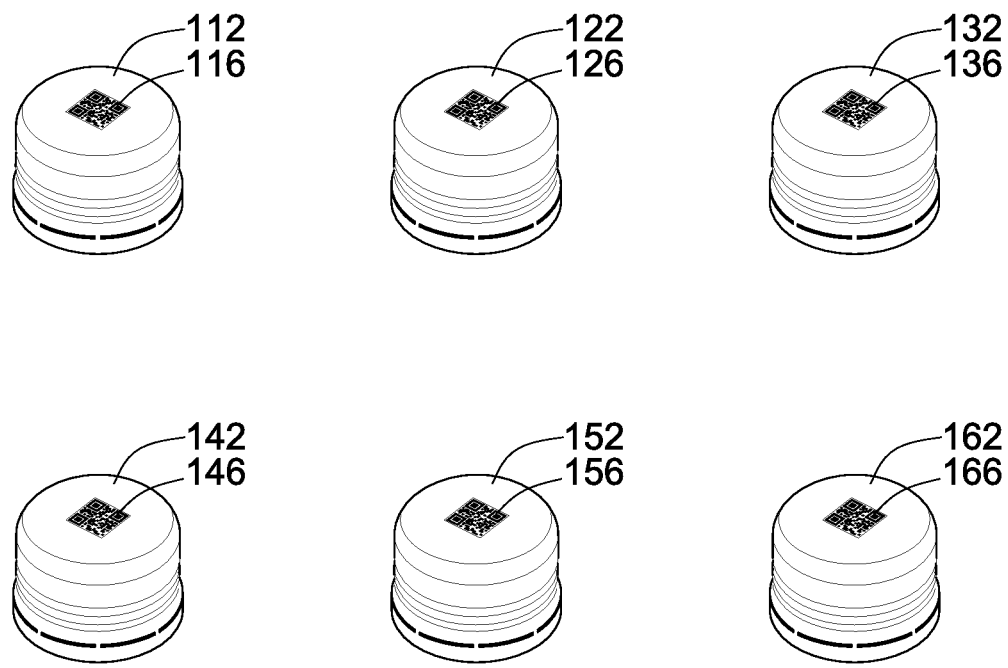

FIG. 7C shows the outer surface of the lids 112, 122, 132, 142, 152, and 162 according to one embodiment of the present disclosure. The container 110 includes an identification 116 printed on the inner surface of the lid 112. The container 120 includes an identification 126 printed on the inner surface of the lid 122. The container 130 includes an identification 136 printed on the inner surface of the lid 132. The container 140 includes an identification 146 printed on the inner surface of the lid 142. The container 150 includes an identification 156 printed on the inner surface of the lid 152. The container 160 includes an identification 166 printed on the inner surface of the lid 162.

The identification 116 is unique for identifying the container 110. The identification 126 is unique for identifying the container 120. The identification 136 is unique for identifying the container 130. The identification 146 is unique for identifying the container 140. The identification 156 is unique for identifying the container 150. The identification 166 is unique for identifying the container 160.

The identification 116 is associated with the identification 114. The identification 126 is associated with the identification 124. The identification 136 is associated with the identification 134. The identification 146 is associated with the identification 144. The identification 156 is associated with the identification 154. The identification 166 is associated with the identification 164.

Figure 8:
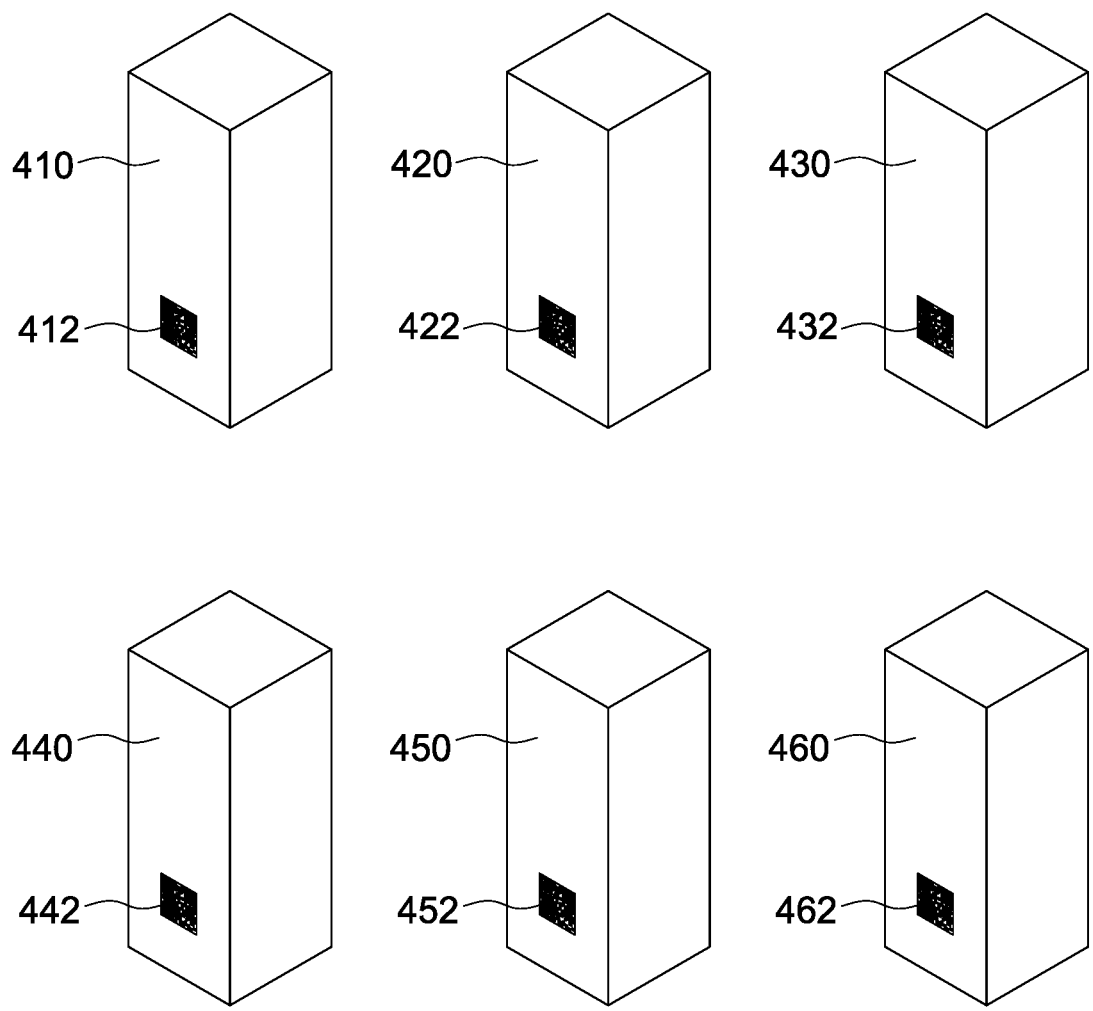
FIG. 8 shows packages according to one embodiment of the present disclosure.

FIG. 8 shows packages 410, 420, 430, 440, 450, and 460 according to one embodiment of the present disclosure. Each of the packages 410, 420, 430, 440, 450, and 460 includes an identification. The package 410 includes an identification 412. The package 420 includes an identification 422. The package 430 includes an identification 432. The package 440 includes an identification 442. The package 450 includes an identification 452. The package 460 includes an identification 462.

Each of the identifications 412, 422, 432, 442, 452, and 462 is unique for identifying a package. The identification 412 is unique for identifying the package 410. The identification 422 is unique for identifying the package 420. The identification 432 is unique for identifying the package 430. The identification 442 is unique for identifying the package 440. The identification 452 is unique for identifying the package 450. The identification 462 is unique for identifying the package 460.

One container is disposed in one package. For example, the container 110 is disposed in the package 410. The container 120 is disposed in the package 420. The container 130 is disposed in the package 430. The container 140 is disposed in the package 440. The container 150 is disposed in the package 450. The container 160 is disposed in the package 460.

Each of the identifications 412, 422, 432, 442, 452, and 462 is associated with an identification of a corresponding container which is disposed in a corresponding package (410, 420, 430, 440, 450, or 460). In some embodiments, the identification 412 of the package 410 is associated with the identification 116 of a specific container 110. The identification 422 of the package 420 is associated with the identification 126 of a specific container 120. The identification 432 of the package 430 is associated with the identification 136 of a specific container 130. The identification 442 of the package 440 is associated with the identification 146 of a specific container 140. The identification 452 of the package 450 is associated with the identification 156 of a specific container 150. The identification 462 of the package 460 is associated with the identification 166 of a specific container 160.

In some embodiments, the association between the identification 412 of the package 410 and the identification 116 of the container 110 may indicate that the container 110 is disposed in the package 410. The association between the identification 422 of the package 420 and the identification 126 of the container 120 may indicate that the container 120 is disposed in the package 420. The association between the identification 432 of the package 430 and the identification 136 of the container 130 may indicate that the container 130 is disposed in the package 430. The association between the identification 442 of the package 440 and the identification 146 of the container 140 may indicate that the container 140 is disposed in the package 440. The association between the identification 452 of the package 450 and the identification 156 of the container 150 may indicate that the container 150 is disposed in the package 450. The association between the identification 462 of the package 460 and the identification 166 of the container 160 may indicate that the container 160 is disposed in the package 460.

Referring FIG. 8 again, in some embodiments, two or more containers 100 may be disposed in one package 400. For example, the containers 110, 120, 130, 140, 150, and 160 can be disposed in the package 410. The identification 412 of the package 410 is associated with the identifications 116, 126, 136, 146, 156, and 166 containers 110, 120, 130, 140, 150, and 160.

In some embodiments, the association between the identification 412 of the package 410 and the identification 116 of the container 110 may indicate that the container 110 is disposed in the package 410. The association between the identification 412 of the package 410 and the identification 126 of the container 120 may indicate that the container 120 is disposed in the package 410. The association between the identification 412 of the package 410 and the identification 136 of the container 130 may indicate that the container 130 is disposed in the package 410. The association between the identification 412 of the package 410 and the identification 146 of the container 140 may indicate that the container 140 is disposed in the package 410. The association between the identification 412 of the package 410 and the identification 156 of the container 150 may indicate that the container 150 is disposed in the package 410. The association between the identification 412 of the package 410 and the identification 166 of the container 160 may indicate that the container 160 is disposed in the package 410.

Figure 9:
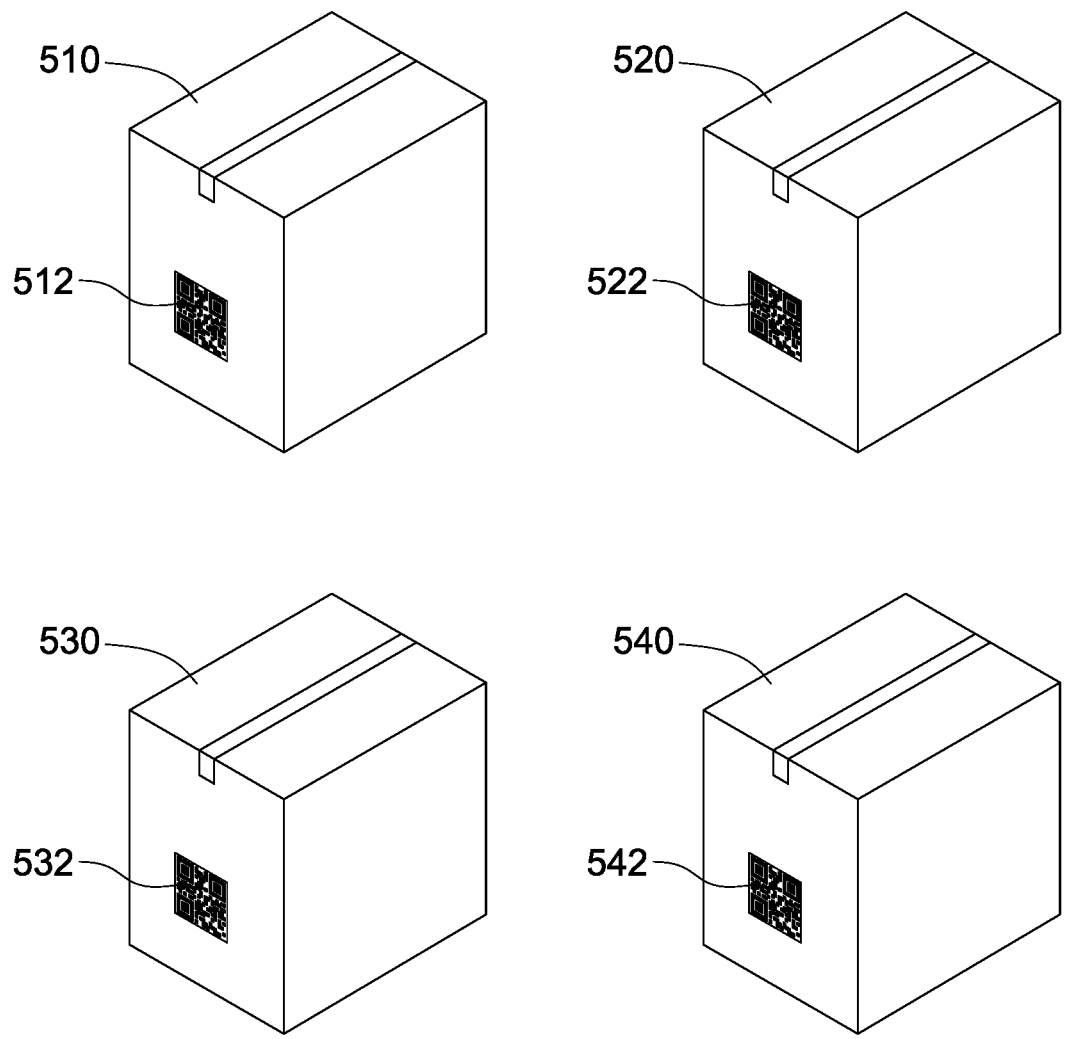
FIG. 9 shows packages according to one embodiment of the present disclosure.

FIG. 9 shows packages 510, 520, 530, and 540 according to one embodiment of the present disclosure. Each of the packages 510, 520, 530, and 540 includes an identification. The package 510 includes an identification 512. The package 520 includes an identification 522. The package 530 includes an identification 532. The package 540 includes an identification 542.

Each of the identifications 512, 522, 532, and 542 is unique for identifying a package. The identification 512 is unique for identifying the package 510. The identification 522 is unique for identifying the package 520. The identification 532 is unique for identifying the package 530. The identification 542 is unique for identifying the package 540.

Two or more packages (like packages 410 to 460) may be disposed in one of packages 510 to 540. For example, the packages 410, 420, 430, 440, 450, and 460 can be disposed in the package 510; another six packages (like packages 410 to 460) can be disposed in the package 520; another six packages (like packages 410 to 460) can be disposed in the package 530; and another six packages (like packages 410 to 460) can be disposed in the package 540.

Each of the identifications 512, 522, 532, and 542 is associated with the identification of the corresponding packages which are disposed in a corresponding package (510, 520, 530, or 540). In some embodiments, the identification 512 of the package 510 is associated with the identification 412 of the package 410, the identification 422 of the package 420, the identification 432 of the package 430, the identification 442 of the package 440, the identification 452 of the package 450, and the identification 462 of the package 460.

In some embodiments, the association between the identification 512 of the package 510 and the identification 412 of the package 410 may indicate that the package 410 is disposed in the package 510. The association between the identification 512 of the package 510 and the identification 422 of the package 420 may indicate that the package 420 is disposed in the package 510. The association between the identification 512 of the package 510 and the identification 432 of the package 430 may indicate that the package 430 is disposed in the package 510. The association between the identification 512 of the package 510 and the identification 442 of the package 440 may indicate that the package 440 is disposed in the package 510. The association between the identification 512 of the package 510 and the identification 452 of the package 450 may indicate that the package 450 is disposed in the package 510. The association between the identification 512 of the package 510 and the identification 462 of the package 460 may indicate that the package 460 is disposed in the package 510.

Referring FIG. 9 again, in some embodiments, one package (like one of the packages 410 to 460) may be disposed in one of the packages 510 to 540. For example, the package 410 can be disposed in the package 510; the package 420 can be disposed in the package 520; the package 430 can be disposed in the package 530; and the package 440 can be disposed in the package 540. Each of the identifications 512, 522, 532, and 542 is associated with the identification of the corresponding package which is disposed in a corresponding package (510, 520, 530, or 540). For example, the identification 512 of the package 510 is associated with the identification 412 of the package 410; the identification 522 of the package 520 is associated with the identification 422 of the package 420; the identification 532 of the package 530 is associated with the identification 432 of the package 430; and the identification 542 of the package 540 is associated with the identification 442 of the package 440.

The association between the identification 512 of the package 510 and the identification 412 of the package 410 may indicate that the package 410 is disposed in the package 510. The association between the identification 522 of the package 520 and the identification 422 of the package 420 may indicate that the package 420 is disposed in the package 520. The association between the identification 532 of the package 530 and the identification 432 of the package 430 may indicate that the package 430 is disposed in the package 530. The association between the identification 542 of the package 540 and the identification 442 of the package 440 may indicate that the package 440 is disposed in the package 540.

Figure 10:
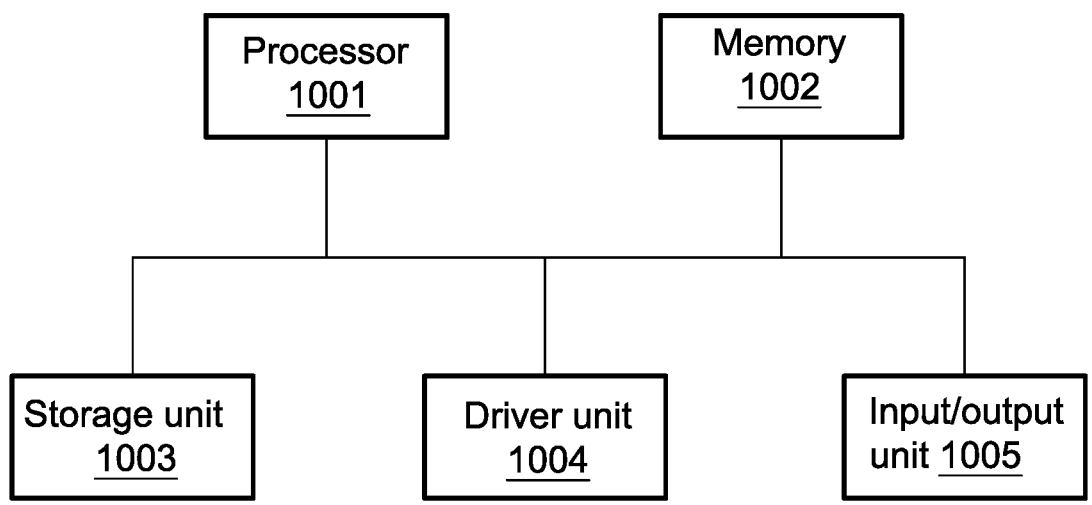
FIG. 10 is a schematic view of a system according to one embodiment of the present disclosure.

FIG. 10 is a schematic view of a system 1000 according to one embodiment of the present disclosure. In some embodiments, the system 1000 may be a production system. In some embodiments, the system 1000 may be a distribution system. The system 1000 may include, but is not limited to, processor 1001, memory 1002, storage unit 1003, driver unit 1004, and input/output unit 1005. The processor 1001, the memory 1002, the storage unit 1003, the driver unit 1004, and the input/output unit 1005 are coupled together and are in communication with each other.

The memory 1002 may store instructions that can be executed by the processor 1001. Upon executing the instructions stored in the memory 1002, the processor 1001 may instruct any one of the storage unit 1003, the drive unit 1004, and input/output unit 1005. In some embodiments, the storage unit 1003 may be instructed to save data or output data to other units or other systems. In some embodiments, the drive unit 1004 may be instructed to drive some production apparatuses or drive some mechanical apparatuses. In some embodiments, the output/input unit 1005 may be instructed to receive data or signal form some sensing devices or some input devices. In some embodiments, the output/input unit 1005 may be instructed to send data or signal to some output devise or other units.

In some embodiments, the system 1000 may be instructed to perform, but is not limited to, the operations described in the present disclosure.

Figure 11:
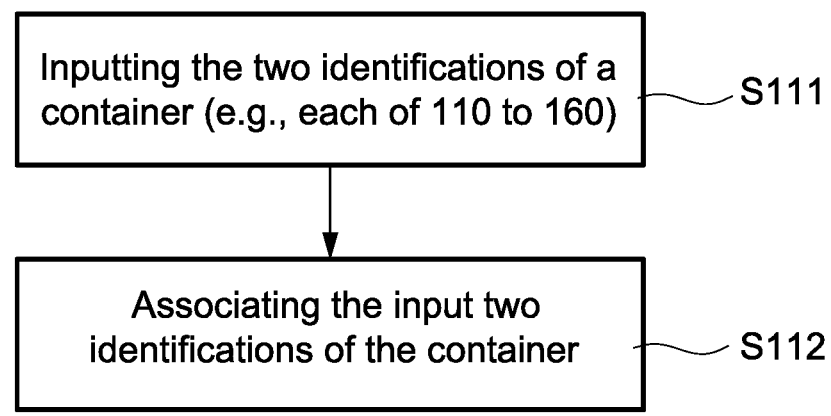
FIGS. 11-17 are flowcharts of operations performed by a system according to one embodiment of the present disclosure.

FIG. 11 shows operations performed by the system 1000 according to one embodiment of the present disclosure. In operation S111, two identifications of a container are input via one or more sensors or input devices. In some embodiments, two identifications of each of the containers 110 to 160 are input via one or more sensors or input devices. For example, the identification 114 and 116 of the container 110 can be input via one or two sensors. In some embodiments, the identifications 302 and 304 can be input via one or two sensors or input devices. In some embodiments, the sensors or input devices may include a camera, an optical scanner, an infrared camera, or an ultraviolet camera.

In operation S112, the two input identifications of a container are associated. In some embodiments, two identifications of each of the containers 110 to 160 are associated. For example, the identification 114 and 116 of the container 110 are associated. In some embodiments, the identifications 302 and 304 are associated. In some embodiments, the association of the two identifications may be stored in the storage unit 1003.

Figure 12:
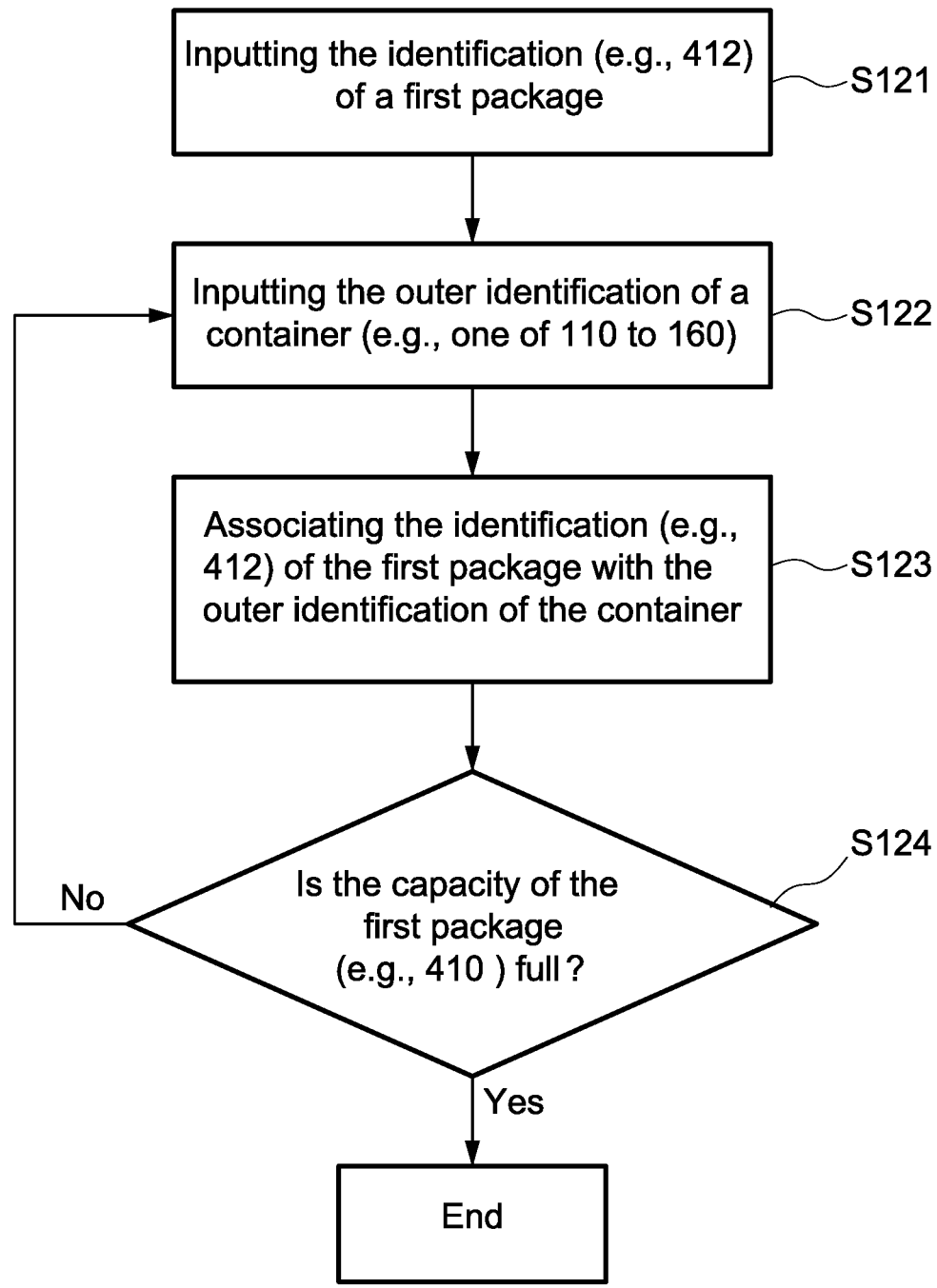

FIG. 12 shows operations performed by the system 1000 according to one embodiment of the present disclosure. In operation S121, the identification of a first package is input via one or more sensors or input devices. In some embodiments, the identification 412 of a first package 410 is input.

In some embodiments, the sensors or input devices may include a camera, an optical scanner, an infrared camera, or an ultraviolet camera.

In operation S122, the outer identification of a container is input via one or more sensors or input devices. In some embodiments, the outer identification 116 of the container 110 is input via one or more sensors. In some embodiments, the outer identification 302 of the container 300 is input via one or more sensors.

In operation S123, the input identification of the first package is associated with the input identification of the container. For example, the input identification 412 of the package 410 is associated with the input outer identification 116 of the container 110. In some embodiments, the input identification 412 of the package 410 is associated with the input outer identification 302 of the container 300.

In some embodiments, the association of the two identifications may be stored in the storage unit 1003. For example, the association between the input identification 412 of the package 410 and the input outer identification 116 of the container 110 may be stored in the storage unit 1003. In some embodiments, the association between the input identification 412 of the package 410 and the input outer identification 302 of the container 300 may be stored in the storage unit 1003.

In operation S124, it is determined whether the capacity of the first package is full. In some embodiments, the capacity of the first package may be one or more containers. In some embodiments, the capacity of the first package 400 or 410 may be one or more container 100 (or 110). In some embodiments, the capacity of the first package 400 or 410 may be one or more container 300.

In some embodiments, operation S124 may determine whether the capacity of the first package 410 is full by a detector. In some embodiments, operation S124 may determine whether the capacity of the first package 400 is full through counting the number of the container 110 packed into the first package 410. For example, it is assumed that the capacity of the first package 410 may be six containers 110. If one container 110 is conveyed to the first package 410 on a conveyor belt, then the counter adds 1. When the counter equals 6, it indicates that six containers 110 have been conveyed to the first package 410 and that the capacity of the first package 410 is full.

In operation S124, when the capacity of the first package is not full, operations S122 and S123 will be performed again. When the capacity of the first package is not full, the outer identification of another container (which is different from the previous container) is input. Then, the input identification of the first package is associated with the input outer identification of the container.

In some embodiments, when the capacity of the first package 410 is not full, the outer identification 126 of another container 120 (which is different from the previous container 110) is input; then the input identification 412 of the first package 410 is associated with the input outer identification 126 of the container 120. In some embodiments, when the capacity of the first package 410 is not full, the outer identification 302 of another container 300 (which is different from the previous container 300) is input; then, the input identification 412 of the first package 410 is associated with the input identification 302 of the container 300.

In operation S124, when the capacity of the first package is full, the operations end. In some embodiments, when capacity of the first package is full, the operations will restart from S121 with another first package (e.g., the package 420 different from the package 410).

Figure 13:
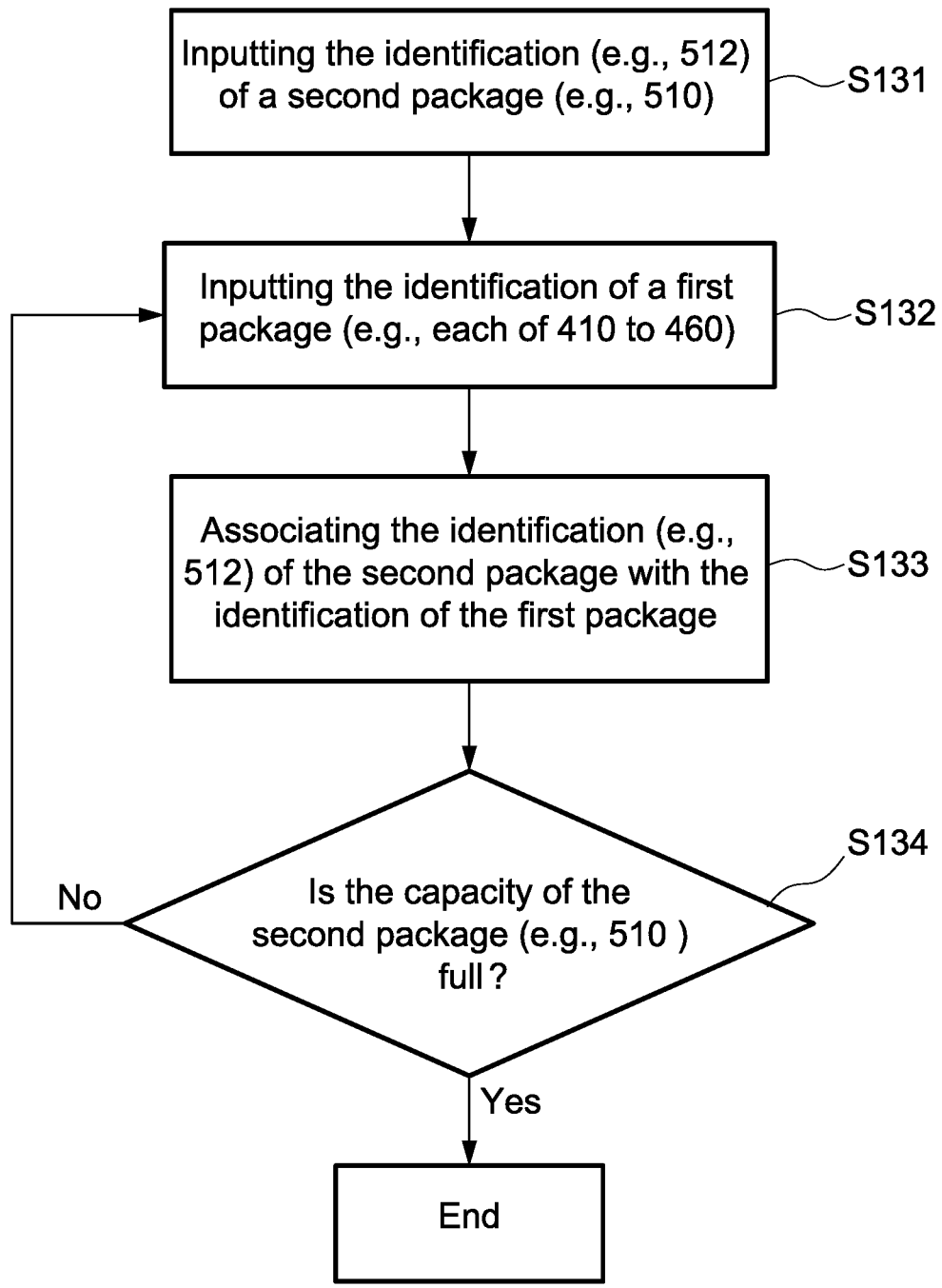

FIG. 13 shows operations performed by the system 1000 according to one embodiment of the present disclosure. In operation S131, the identification of a second package is input via one or more sensors or input devices. In some embodiments, the identification 512 of a first package 510 is input. In some embodiments, the sensors or input devices may include a camera, an optical scanner, an infrared camera, or an ultraviolet camera.

In operation S132, the outer identification of a first package is input via one or more sensors or input devices. In some embodiments, the identification 412 of the first package 410 is input via one or more sensors.

In operation S133, the input identification of the second package is associated with the input identification of the first package. For example, the input identification 512 of the package 510 is associated with the input identification 412 of the package 410.

In some embodiments, the association of the two identifications may be stored in the storage unit 1003. For example, the association between the input identification 512 of the package 510 and the input identification 412 of the package 410 may be stored in the storage unit 1003.

In operation S134, it is determined whether the capacity of the second package is full. In some embodiments, the capacity of the second package may be one or more first packages. In some embodiments, the capacity of the second package 500 or 510 may be six first packages 100 (or first packages 110 to 160).

In some embodiments, operation S134 may determine whether the capacity of the second package 510 is full by a detector. In some embodiments, operation S134 may determine whether the capacity of the second package 510 is full through counting the number of the first package 410 packed into the second package 510. For example, it is assumed that the capacity of the second package 510 may be six first packages 410. If one first package 410 is conveyed to the second package 510 on a conveyor belt, then the counter adds 1. When the counter equals 6, it indicates that six first packages 410 have been conveyed to the second package 510 and that the capacity of the second package 510 is full.

In operation S134, when the capacity of the first package is not full, operations S132 and S133 will be performed again. When the capacity of the second package is not full, the identification of another first package (which is different from the previous first package) is input. Then, the input identification of the second package is associated with the input identification of the first package.

In some embodiments, when the capacity of the second package 510 is not full, the identification 422 of another first package 420 (which is different from the previous container 110) is input; then, the input identification 512 of the second package 510 is associated with the input identification 422 of the first package 420.

In operation S134, when the capacity of the second package is full, the operations end. In some embodiments, when capacity of the second package is full, the operations will restart from S131 with another second package (e.g., the package 520 different from the package 510).

Upon review of the present disclosure, it can be contemplated that a third package which includes an identification may accommodate one or more second packages. The identification of the third package may be associated with each of the identifications of the second packages which is disposed in the third packages.

Figure 14:
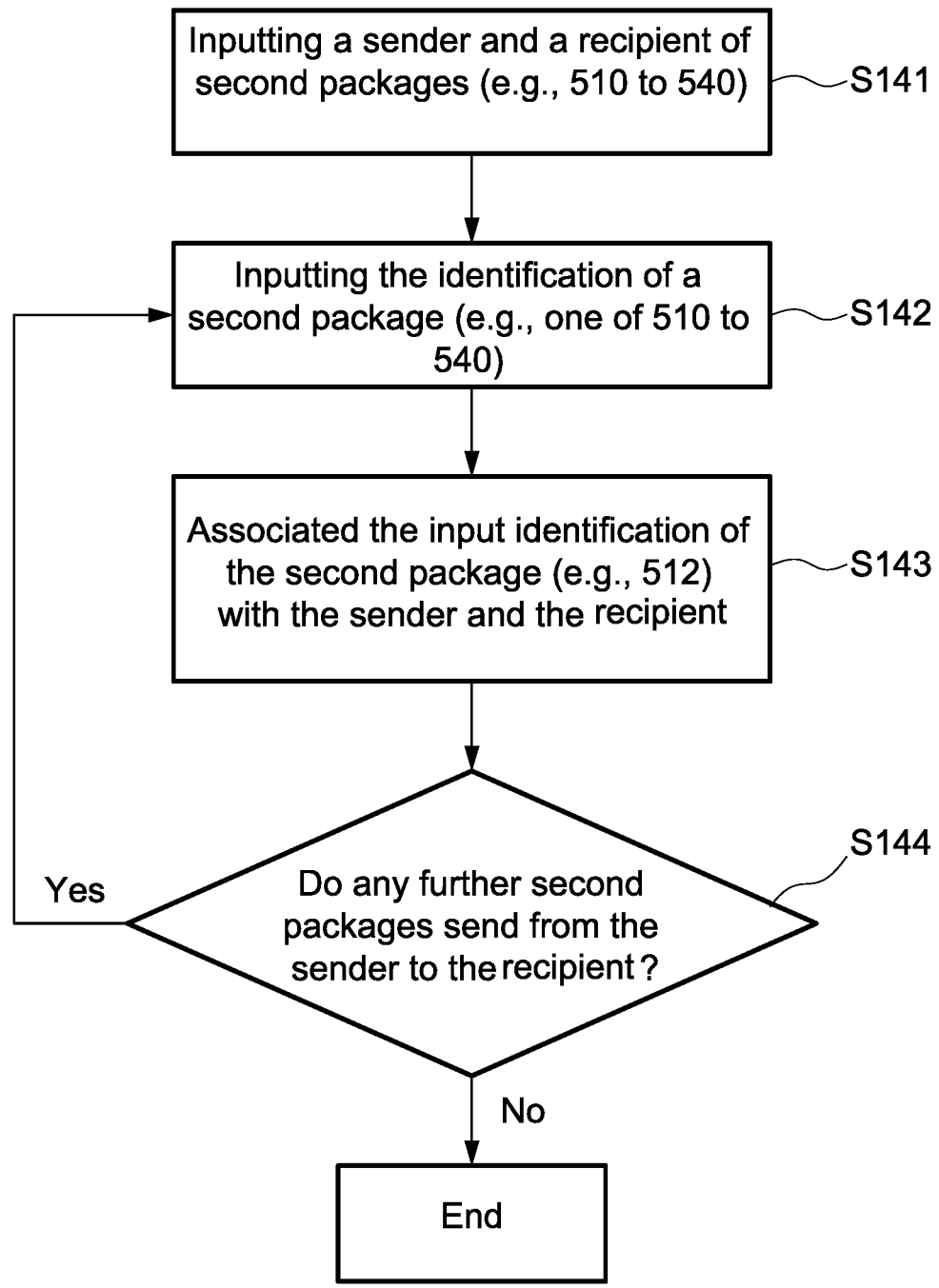

FIG. 14 shows operations performed by the system 1000 according to one embodiment of the present disclosure. In operation S141, a sender and a recipient of second packages are input via one or more input devices. In some embodiments, a sender and a recipient of second packages 510 to 540 are input.

In some embodiments, the second packages may be packed in a factory of the manufacturer. In some embodiments, the second packages may be sent from a factory of the manufacturer to a distributor. In some embodiments, the second packages may be sent from a distributor to a wholesaler. In some embodiments, the second packages may be sent from a wholesaler to a retailer.

In some embodiments, the operations described in FIG. 14 may be performed in a factory. In some embodiments, the operations described in FIG. 14 may be performed by a distributor. In some embodiments, the operations described in FIG. 14 may be performed by a wholesaler. In some embodiments, the operations described in FIG. 14 may be performed by a retailer.

In operation S142, the identification of a second package is input via one or more sensors or input devices. In some embodiments, the identification of one of second packages 510 to 540 is input. In some embodiments, the sensors or input devices may include a camera, an optical scanner, an infrared camera, or an ultraviolet camera.

In operation S143, the input identification of the second package is associated with the input sender and the input recipient. In some embodiments, the input identification 512 of the second package 510 is associated with the input sender and the input recipient. The association may be stored in the storage unit 1003.

In operation S144, it is determined whether any further second packages to be sent from the input sender to the input recipient. When further second packages are to be sent from the input sender to the input recipient, operations S142 and S143 are repeated.

In some embodiments, when there are further second packages to be sent from the input sender to the input recipient, the identification of another second package is input, and the input identification of the second package is associated with the input sender and input recipient. For example, when the second package 520 (different from the second package 510) is to be sent from the input sender to the input recipient, the identification 522 of the second package 520 is input, and the input identification 522 of the second package 520 is associated with the input sender and the input recipient.

In operation S144, when no further second package is to be sent from the input sender to the input recipient, the operations end. In some embodiments, when no further second package is to be sent from the input sender to the input recipient, the operations will restart from S141 with another sender and/or another recipient.

Figure 15:
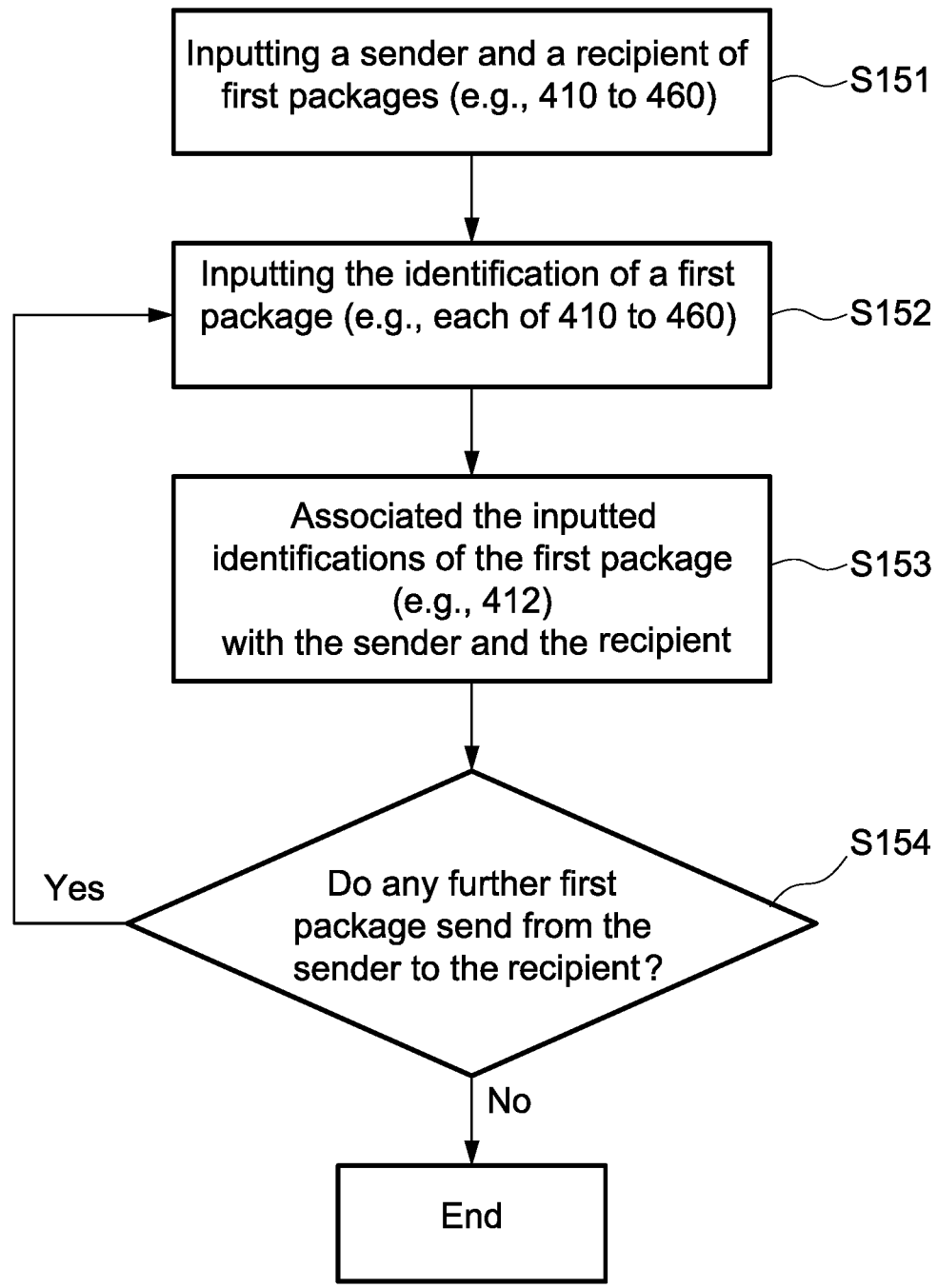

FIG. 15 shows operations performed by the system 1000 according to one embodiment of the present disclosure. In operation S151, a sender and a recipient of first packages are input via one or more input devices. In some embodiments, a sender and a recipient of first packages 410 to 460 are input.

In some embodiments, the first packages may be packed in a factory of the manufacturer. In some embodiments, the first packages may be sent from a factory of the manufacturer to a distributor. In some embodiments, the first packages may be sent from a distributor to a wholesaler. In some embodiments, the first packages may be sent from a wholesaler to a retailer.

In some embodiments, the operations described in FIG. 15 may be performed in a factory. In some embodiments, the operations described in FIG. 15 may be performed by a distributor. In some embodiments, the operations described in FIG. 15 may be performed by a wholesaler. In some embodiments, the operations described in FIG. 15 may be performed by a retailer.

In operation S152, the identification of a first package is input via one or more sensors or input devices. In some embodiments, the identification of one of first packages 410 to 460 is input. In some embodiments, the sensors or input devices may include a camera, an optical scanner, an infrared camera, or an ultraviolet camera.

In operation S153, the input identification of the first package is associated with the input sender and the input recipient. In some embodiments, the input identification 412 of the first package 410 is associated with the input sender and the input recipient. The association may be stored in the storage unit 1003.

In operation S154, it is determined whether any further first packages are to be sent from the input sender to the input recipient. When further first packages are to be sent from the input sender to the input recipient, operations S152 and S153 are repeated.

In some embodiments, when there are further first packages to be sent from the input sender to the input recipient, the identification of another first package is input, and the input identification of the first package is associated with the input sender and input recipient. For example, when the first package 420 (different from the first package 410) is to be sent from the input sender to the input recipient, the identification 422 of the second package 420 is input, and the input identification 422 of the first package 420 is associated with the input sender and the input recipient.

In operation S154, when no further first packages are to be sent from the input sender to the input recipient, the operations end. In some embodiments, when no further first packages are to be sent from the input sender to the input recipient, the operations will restart from S151 with another sender and/or another recipient.

Figure 16:
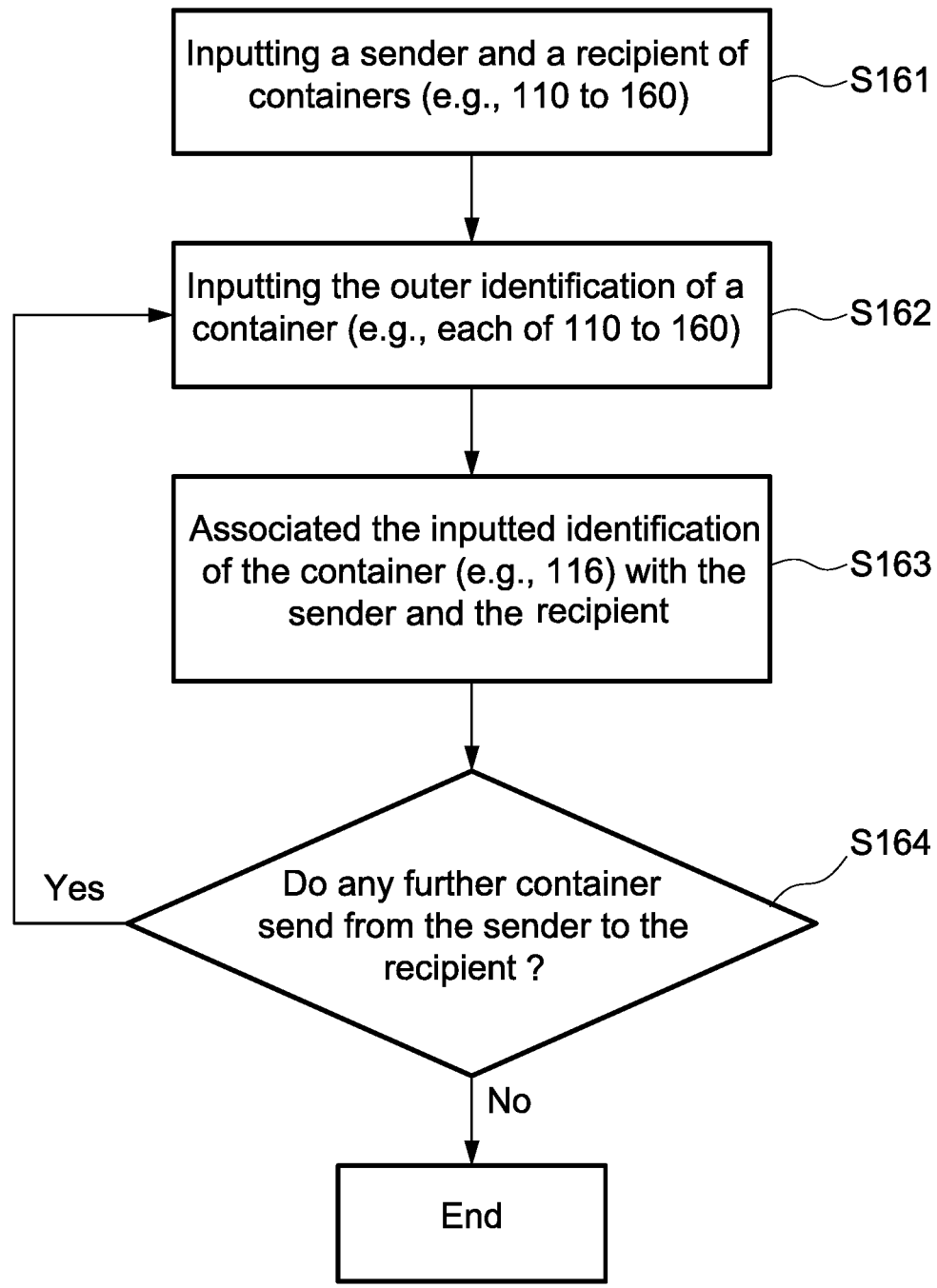

FIG. 16 shows operations performed by the system 1000 according to one embodiment of the present disclosure. In operation S161, a sender and a recipient of containers are input via one or more input devices. In some embodiments, a sender and a recipient of containers 110 to 160 are input.

In some embodiments, the containers may be packed in a factory of the manufacturer. In some embodiments, the containers may be sent from a factory of the manufacturer to a distributor. In some embodiments, the containers may be sent from a distributor to a wholesaler. In some embodiments, containers may be sent from a wholesaler to a retailer.

In some embodiments, the operations described in FIG. 16 may be performed in a factory. In some embodiments, the operations described in FIG. 16 may be performed by a distributor. In some embodiments, the operations described in FIG. 16 may be performed by a wholesaler. In some embodiments, the operations described in FIG. 16 may be performed by a retailer.

In operation S162, the outer identification of containers is input via one or more sensors or input devices. In some embodiments, the outer identification (e.g., identification 116) of one of containers 110 to 160 is input. In some embodiments, the outer identification 302 of a container 300 is input. In some embodiments, the sensors or input devices may include a camera, an optical scanner, an infrared camera, or an ultraviolet camera.

In operation S163, the input outer identification of the container is associated with the input sender and the input recipient. In some embodiments, the input outer identification 116 of the container 110 is associated with the input sender and the input recipient. In some embodiments, the input outer identification 302 of the container 300 is associated with the input sender and the input recipient. The association may be stored in the storage unit 1003.

In operation S164, it is determined whether any further containers are to be sent from the input sender to the input recipient. When there are further containers to be sent from the input sender to the input recipient, operations S162 and S163 are repeated.

In some embodiments, when there are further containers to be sent from the input sender to the input recipient, the identification of another container is input, and the input identification of the container is associated with the input sender and input recipient. For example, when the container 120 (different from the container 110) to be sent from the input sender to the input recipient, the identification 126 of the container 120 is input, and the input identification 126 of the container 120 is associated with the input sender and the input recipient.

In operation S164, when no further containers are to be sent from the input sender to the input recipient, the operations end. In some embodiments, when no further containers are to be sent from the input sender to the input recipient, the operations will restart from S161 with another sender and/or another recipient.

Figure 17:
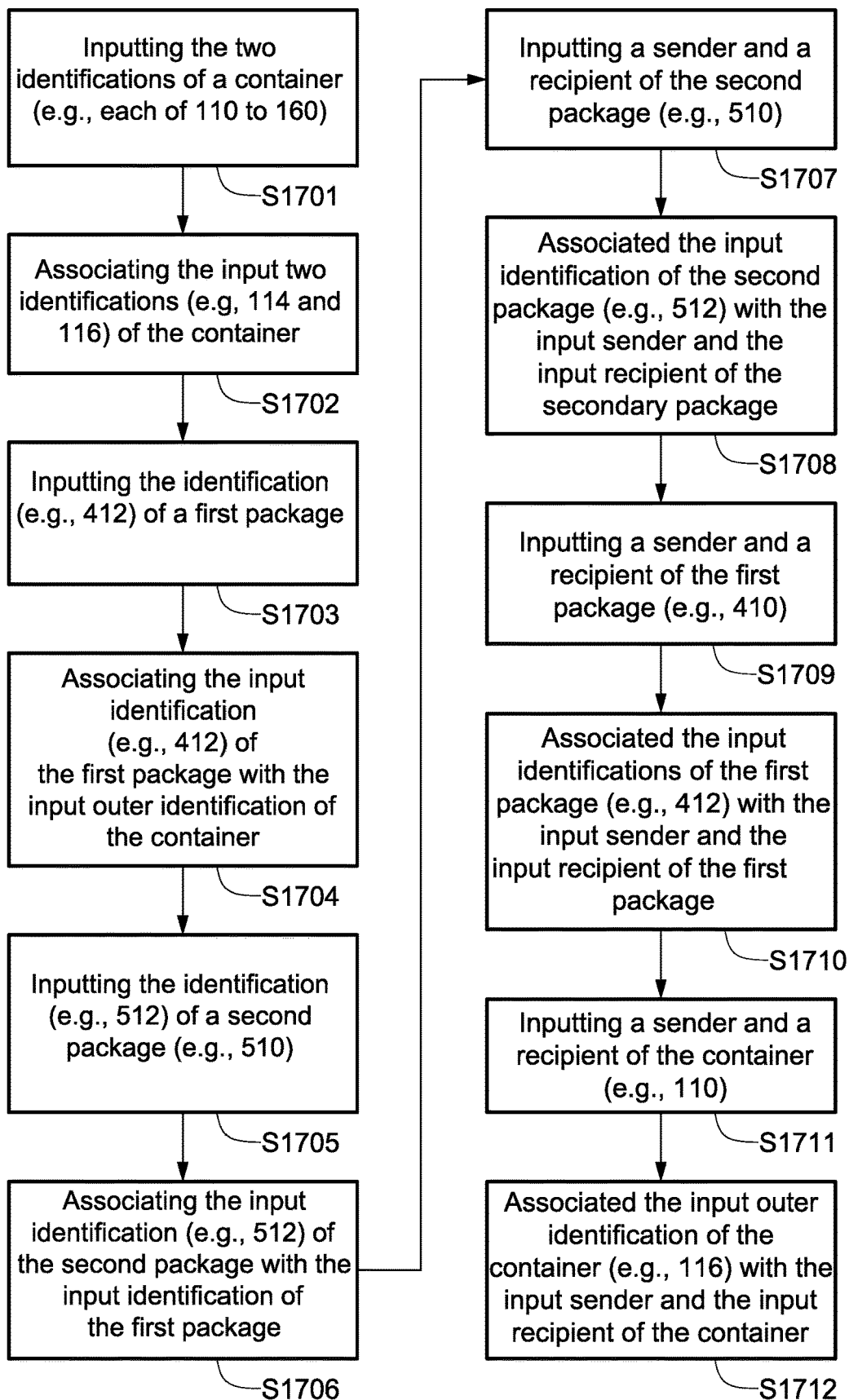

FIG. 17 shows operations performed by the system 1000 according to one embodiment of the present disclosure. In some embodiments, the operations described in FIG. 17 may be performed in a factory.

In operations, S1701, two identifications of a container are input via one or more sensors or input devices. In some embodiments, the identifications 114 and 116 of the container 110 are input. In some embodiments, the identifications 302 and 304 of the container 300 are input.

In operation S1702, the input two identifications of the container are associated. In some embodiments, the input two identifications 114 and 116 of the container 110 are associated. In some embodiments, the input two identifications 302 and 304 of the container 300 are associated.

In operation S1703, the identification of a first package is input via one or more sensors or input devices. In some embodiments, the identification 412 of the first package 410 is input.

In operation S1704, the input identification of the first package is associated with the input outer identification of the container. In some embodiments, the input identification 412 of the first package 410 is associated with the input outer identification 116 of the container 110. In some embodiments, the input identification 412 of the first package 410 is associated with the input outer identification 302 of the container 300.

In operation S1705, the identification of a second package is input via one or more sensors or input devices. In some embodiments, the identification 512 of the second package 510 is input.

In operation S1706, the input identification of the second package is associated with the input identification of the first package. In some embodiments, the input identification 512 of the second package 510 is associated with the input identification 412 of the first package 410.

In operation S1707, a sender and a recipient of the second package are input via one or more input devices. In some embodiments, when the second package 510 will be sent from a sender to a recipient, the sender and the recipient of the second package 510 are input.

In operation S1708, the input identification of the second package is associated with the input sender and the input recipient of the second package. In some embodiments, the input identification 512 of the second package 510 is associated with the input sender and the input recipient of the second package 510.

In operation S1709, a sender and a recipient of the first package are input via one or more input devices. In some embodiments, when the first package 410 will be sent from a sender to a recipient, the sender and the recipient of the first package 410 are input.

In operation S1710, the input identification of the first package is associated with the input sender and the input recipient of the first package. In some embodiments, the input identification 412 of the first package 410 is associated with the input sender and the input recipient of the first package 410.

In operation S1711, a sender and a recipient of the container are input via one or more input devices. In some embodiments, when the container 110 will be sent from a sender to a recipient, the sender and the recipient of the container 110 are input. In some embodiments, when the container 300 will be sent from a sender to a recipient, the sender and the recipient of the container 300 are input.

In operation S1712, the input outer identification of the container is associated with the input sender and the input recipient of the container. In some embodiments, the input outer identification 116 of the container 100 is associated with the input sender and the input recipient of the container 100. In some embodiments, the input outer identification 302 of the container 300 is associated with the input sender and the input recipient of the container 300.

Figure 18:
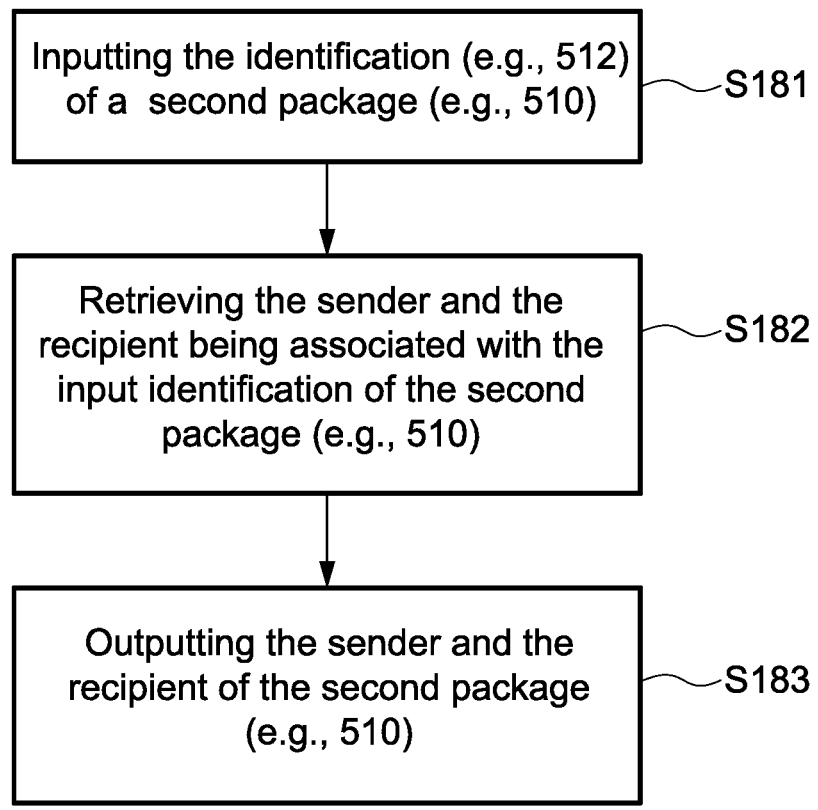
FIGS. 18-21 are flowcharts of operations performed by a system according to one embodiment of the present disclosure.

FIG. 18 shows operations performed by the system 1000 according to one embodiment of the present disclosure. In operation S181, the identification of a second package can be input via one or more sensors or input devices. In some embodiments, the identification 512 of the second package 510 can be input by any one of a camera, an optical scanner, an infrared camera, and an ultraviolet camera.

In operation S182, the sender and the recipient which are associated with the input identification of the second package are retrieved. In some embodiments, the sender and the recipient which are associated with the input identification 512 of the second package 510 are retrieved. In some embodiments, the sender and the recipient are retrieved from the storage unit 1003.

In operation S183, the sender and the recipient which are associated with the input identification of the second package are output. In some embodiments, the sender and the recipient which are associated with the input identification 512 of the second package 510 are output.

From the sender and recipient of the second package, the supply chain of this product may be obtained. A consumer or an employee of a company may input the identification 512 of a first package 510 into an electronic device, whereupon the electronic device outputs the corresponding supply chain information of the package 510.

Figure 19:
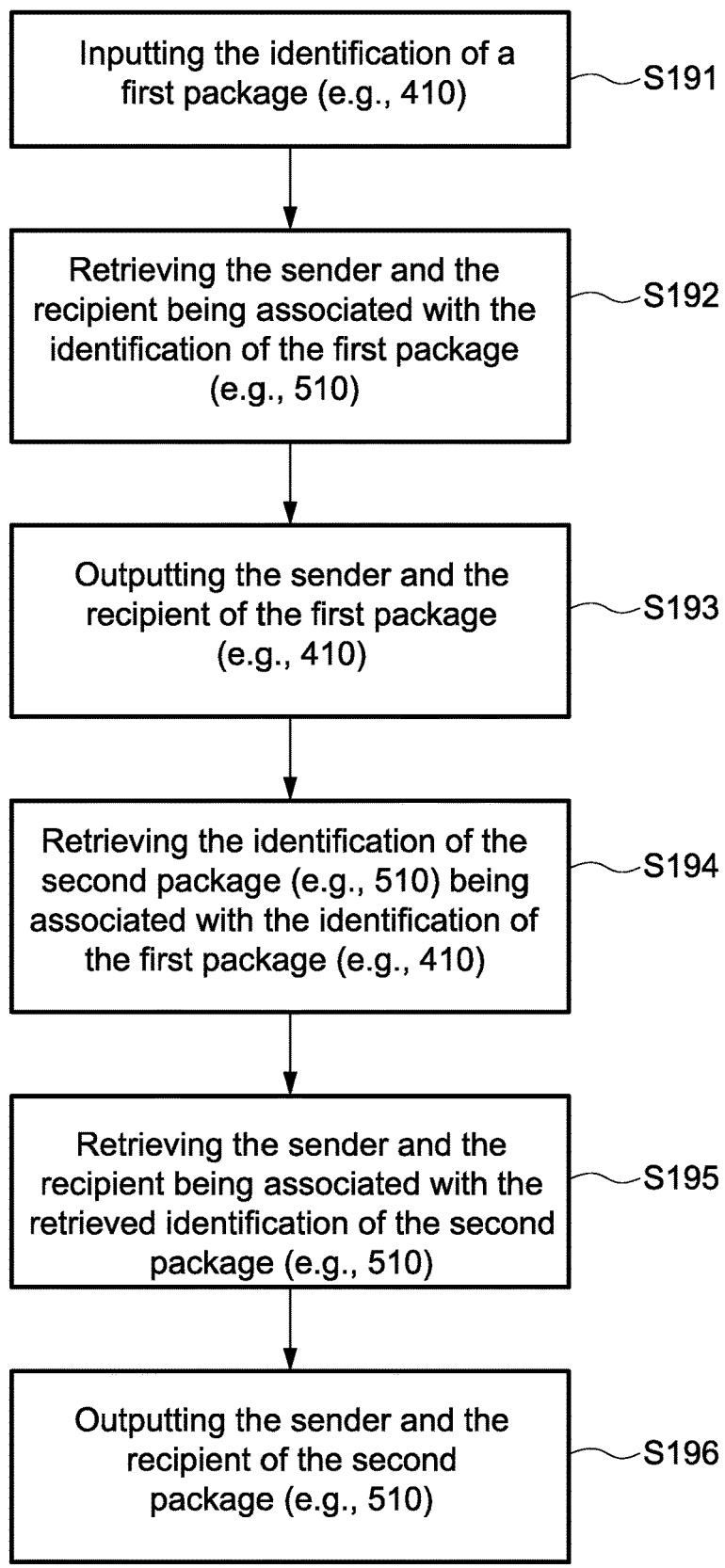

FIG. 19 shows operations performed by the system 1000 according to one embodiment of the present disclosure. In operation S191, the identification of a first package can be input via one or more sensors or input devices. In some embodiments, the identification 412 of the first package 410 can be input by any one of a camera, an optical scanner, an infrared camera, and an ultraviolet camera.

In operation S192, the sender and the recipient which are associated with the input identification of the second package are retrieved. In some embodiments, the sender and the recipient which are associated with the input identification 412 of the first package 410 are retrieved. In some embodiments, the sender and the recipient are retrieved from the storage unit 1003.

In operation S193, the sender and the recipient which are associated with the input identification of the first package are output. In some embodiments, the sender and the recipient which are associated with the input identification 412 of the first package 410 are output.

In operation S194, the identification of a second package which is associated with the input identification of the first package is retrieved. In some embodiments, the identification 512 of a second package 510 which is associated with the input identification 412 of the first package 410 is retrieved. In some embodiments, the identification of the second package which is associated with the input identification of the first package is retrieved from the storage unit 1003.

In operation S195, the sender and the recipient which are associated with the retrieved identification of the second package are retrieved. In some embodiments, the sender and the recipient which are associated with the retrieved identification 512 of the second package 510 are retrieved. In some embodiments, the sender and the recipient are retrieved from the storage unit 1003.

In operation S196, the sender and the recipient which are associated with the retrieved identification of the second package are output. In some embodiments, the sender and the recipient which are associated with the retrieved identification 512 of the second package 510 are output.

From the sender and recipient of the second package and the sender and the recipient of the first package, the supply chain of this product may be obtained. A consumer or an employee of a company may input the identification 412 of a first package 410 into an electronic device, whereupon the electronic device outputs the corresponding supply chain information of the content in the first package 410.

Figure 20:
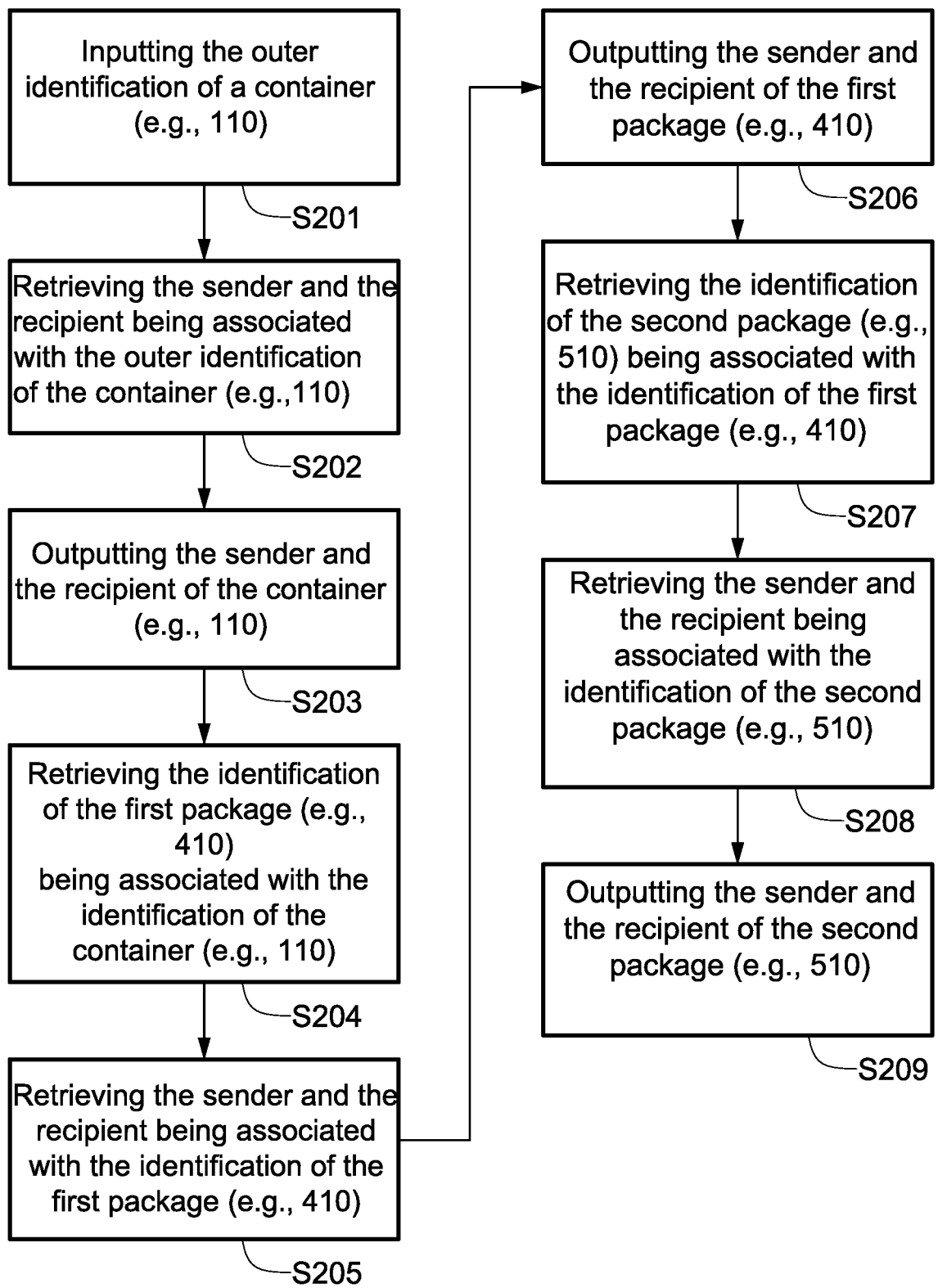

FIG. 20 shows operations performed by the system 1000 according to one embodiment of the present disclosure. In operation S201, the outer identification of a container is input via one or more sensors or input devices. In some embodiments, the identification 116 of the container 110 can be input by any one of a camera, an optical scanner, an infrared camera, and an ultraviolet camera.

In operation S202, the sender and the recipient which are associated with the input outer identification of the container are retrieved. In some embodiments, the sender and the recipient which are associated with the input outer identification 116 of the container 110 are retrieved. In some embodiments, the sender and the recipient are retrieved from the storage unit 1003.

In operation S203, the sender and the recipient which are associated with the input outer identification of the container are output. In some embodiments, the sender and the recipient which are associated with the input outer identification 116 of the container 110 are output.

In operation S204, the identification of a first package which is associated with the input outer identification of the container is output. In some embodiments, the identification 412 of a second package 410 which is associated with the input outer identification 116 of the container 110 is retrieved. In some embodiments, the identification of the first package which is associated with the input outer identification of the container is retrieved from the storage unit 1003.

In operation S205, the sender and the recipient which are associated with the retrieved identification of the first package are retrieved. In some embodiments, the sender and the recipient which are associated with the retrieved identification 412 of the first package 410 are retrieved. In some embodiments, the sender and the recipient are retrieved from the storage unit 1003.

In operation S206, the sender and the recipient which are associated with the retrieved identification of the first package are output. In some embodiments, the sender and the recipient which are associated with the retrieved identification 412 of the first package 410 are output.

In operation S207, the identification of a second package which is associated with the retrieved identification of the first package is retrieved. In some embodiments, the identification 512 of a second package 510 which is associated with the retrieved identification 412 of the first package 410 is retrieved. In some embodiments, the identification of the second package which is associated with the retrieved identification of the first package is retrieved from the storage unit 1003.

In operation S208, the sender and the recipient which are associated with the retrieved identification of the second package are retrieved. In some embodiments, the sender and the recipient which are associated with the retrieved identification 512 of the second package 510 are retrieved. In some embodiments, the sender and the recipient are retrieved from the storage unit 1003.

In operation S209, the sender and the recipient which are associated with the retrieved identification of the second package are output. In some embodiments, the sender and the recipient which are associated with the retrieved identification 512 of the second package 510 are output.

Based on the information regarding the sender and recipient of the second package and the sender and the recipient of the first package, the supply chain of this product may be obtained. A consumer or an employee of a company may input the outer identification 116 of a container 110 into an electronic device, whereupon the electronic device outputs the corresponding supply chain information of the content in the container 110.

Figure 21:
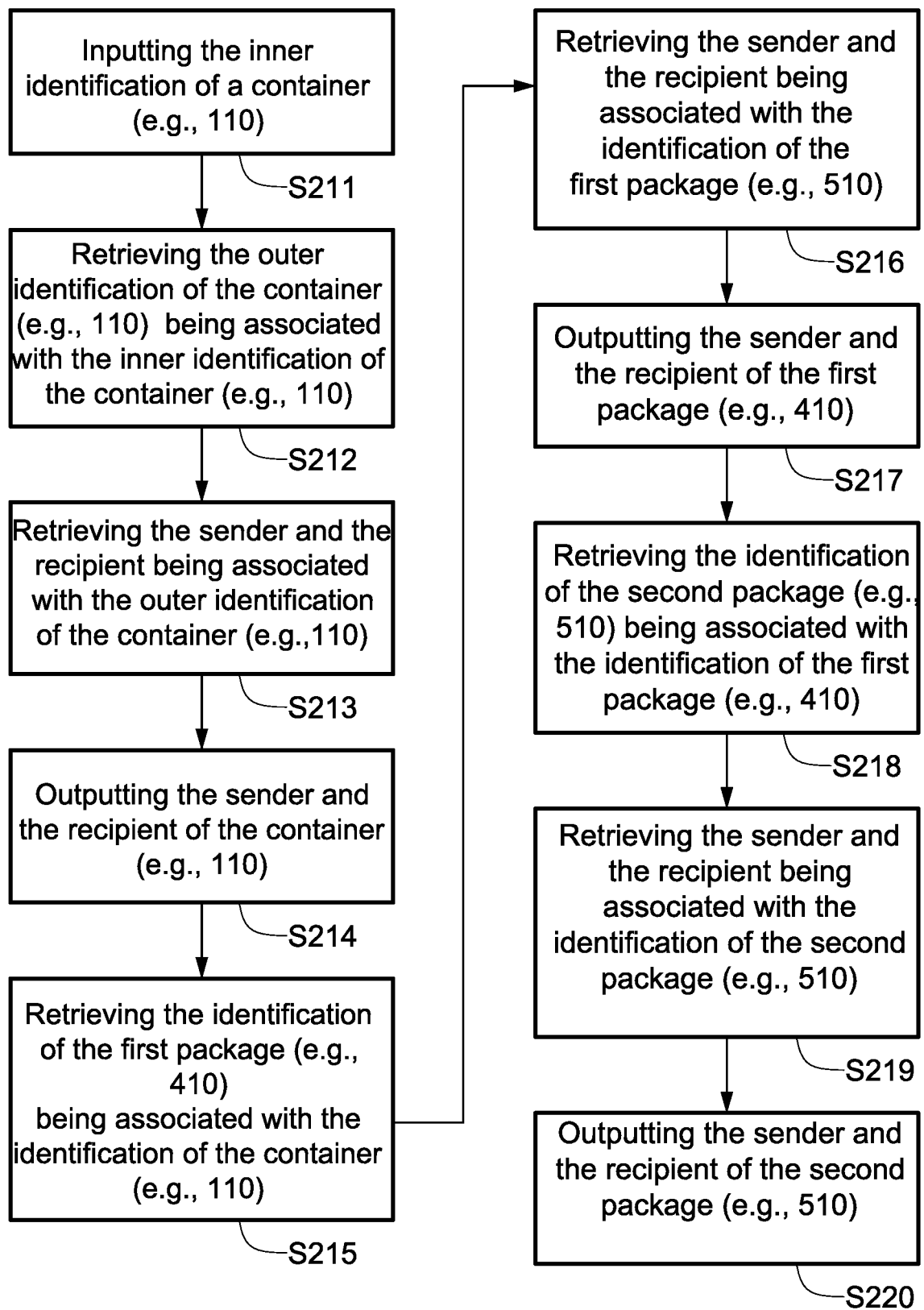

FIG. 21 shows operations performed by the system 1000 according to one embodiment of the present disclosure. In operation S211, the inner identification of a container can be input via one or more sensors or input devices. In some embodiments, the identification 114 of the container 110 can be input by any one of a camera, an optical scanner, an infrared camera, and an ultraviolet camera.

In operation S212, the outer identification of the container which is associated with the input inner identification of the container is retrieved. In some embodiments, the outer identification 116 of the container 110 which is associated with the input inner identification 114 of the container 110 is retrieved. In some embodiments, the outer identification of the container which is associated with the input inner identification of the container is retrieved from the storage unit 1003.

In operation S213, the sender and the recipient which are associated with the retrieved outer identification of the container are retrieved. In some embodiments, the sender and the recipient which are associated with the retrieved outer identification 116 of the container 110 are retrieved. In some embodiments, the sender and the recipient are retrieved from the storage unit 1003.

In operation S214, the sender and the recipient which are associated with the retrieved outer identification of the container are output. In some embodiments, the sender and the recipient which are associated with the retrieved outer identification 116 of the container 110 are output.

In operation S215, the identification of a first package which is associated with the retrieved outer identification of the container is output. In some embodiments, the identification 412 of a second package 410 which is associated with the retrieved outer identification 116 of the container 110 is retrieved. In some embodiments, the identification of the first package which is associated with the input outer identification of the container is retrieved from the storage unit 1003.

In operation S216, the sender and the recipient which are associated with the retrieved identification of the first package are retrieved. In some embodiments, the sender and the recipient which are associated with the retrieved identification 412 of the first package 410 are retrieved. In some embodiments, the sender and the recipient are retrieved from the storage unit 1003.

In operation S217, the sender and the recipient which are associated with the retrieved identification of the first package are output. In some embodiments, the sender and the recipient which are associated with the retrieved identification 412 of the first package 410 are output.

In operation S218, the identification of a second package which is associated with the retrieved identification of the first package is retrieved. In some embodiments, the identification 512 of a second package 510 which is associated with the retrieved identification 412 of the first package 410 is retrieved. In some embodiments, the identification of the second package which is associated with the retrieved identification of the first package is retrieved from the storage unit 1003.

In operation S219, the sender and the recipient which are associated with the retrieved identification of the second package are retrieved. In some embodiments, the sender and the recipient which are associated with the retrieved identification 512 of the second package 510 are retrieved. In some embodiments, the sender and the recipient are retrieved from the storage unit 1003.

In operation S220, the sender and the recipient which are associated with the retrieved identification of the second package are output. In some embodiments, the sender and the recipient which are associated with the retrieved identification 512 of the second package 510 are output.

Based on the information regarding the sender and recipient of the second package and the sender and the recipient of the first package, the supply chain of this product may be obtained. A consumer or an employee of a company may input the inner identification 114 of a container 110 into an electronic device, whereupon the electronic device outputs the corresponding supply chain information of the content in the container 110.

Figure 22:
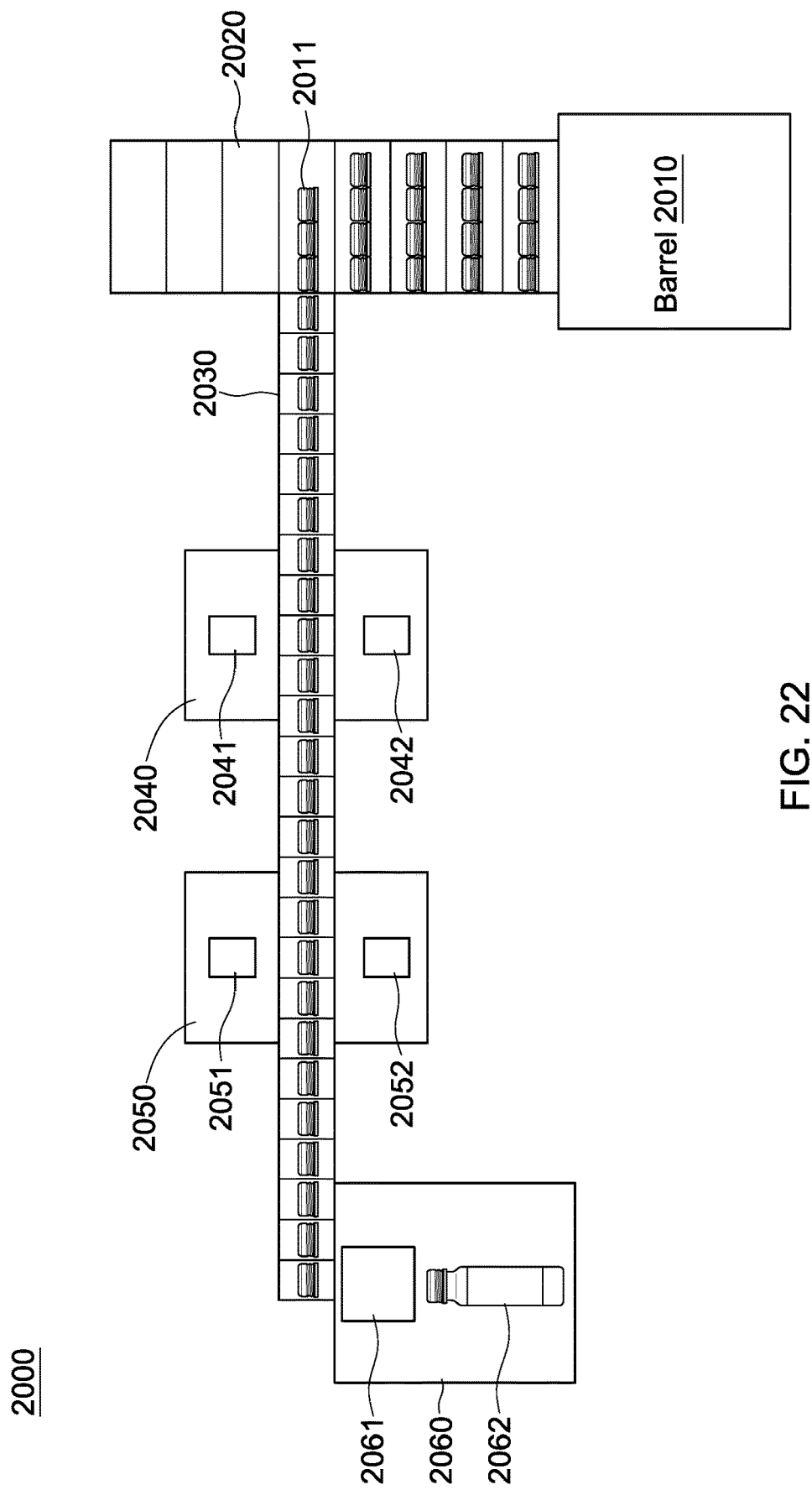
FIG. 22 is a schematic view of a production apparatus according to one embodiment to the present disclosure.

FIG. 22 is a schematic view of a production apparatus 2000 according to one embodiment of the present disclosure. The production apparatus 2000 may be performed to produce the container 100, 110-160 or 200 and content filled therein.

The production apparatus 2000 includes a barrel 2010. The barrel 2010 stores a plurality of lids 2011. The lid 102 and 112 may be embodiments of the lids 2011.

The apparatus 2000 includes conveyor belts 2020 and 2030. In some embodiments, the conveyor belt 2020 vertically picks (from down to up) the lids 2011 and delivers the lids 2011 to the conveyor belt 2030. In some embodiments, the lids 2011 picked by the conveyor belt 2020 may be oriented in the same direction (e.g., the openings of the lids 2011 face the same direction). The conveyor belt 2020 may include many grids, and each grid may accommodate one or more of the lids 2011.

The conveyor belt 2030 receives the lids delivered by the conveyor belt 2020. The conveyor belt 2030 delivers the lids from right to left. The convey belt 2030 may include many grids, each grid accommodating one lid 2011.

In some embodiments, each grid of conveyor belt 2030 accommodates one lid 2011, and each lid 2011 on the convey belt 2030 may be located by counting time difference. In some embodiments, not every grid of conveyor belt 2030 may accommodate one lid 2011, and each lid 2011 on the conveyor belt 2030 may be located by positioning sensors (e.g., IR sensors or laser sensors). In some embodiments, the lids 2011 on the conveyor belt 2030 may be located by positioning sensors and counting time difference.

The production apparatus 2000 includes a printing section 2040. The printing section 2040 includes printers 2041 and 2042. In some embodiments, the printing section 2040 may include positioning sensors (e.g., IR sensors or laser sensors) to locate each lid passing through the printing section 2040.

In some embodiments, the printers 2041 and 2042 may be aligned in position so as to simultaneously print identification on the inner and outer surfaces of a lid. In some embodiments, the printers 2041 and 2042 may be misaligned in position so as to separately print identification on the inner and outer surfaces of a lid. The identification printed with the printers 2041 and 2042 may be visible, infrared-visible, or ultraviolet visible.

The production apparatus 2000 includes a recording section 2050. The recording section 2050 includes input devices 2051 and 2052. The input devices 2051 and 2052 may include a camera, an optical scanner, an infrared camera, or an ultraviolet camera. In some embodiments, the recording section 2050 may include positioning sensors (e.g., IR sensors or laser sensors) to locate each lid passing through the recording section 2050.

In some embodiments, the input devices 2051 and 2052 may be aligned in position so as to simultaneously record or capture an image of the identification on the inner and outer surfaces of a lid. In some embodiments, the input devices 2051 and 2052 may be misaligned in position so as to separately record or capture an image of the identification on the inner and outer surfaces of a lid.

In some embodiments, the recording section 2050 may perform the function of quality control. In some embodiments, when the system 1000 determines that a lid is deformed based on the images provided by the recording section 2050, the system 1000 may instruct (through the drive unit 1004) a blower to blow the deformed lid out of the conveyor belt 2030. In some embodiments, when the system 1000 determines that an identification printed on a lid is not identifiable or accessible based on the images provided by the recording section 2050, the system 1000 may instruct (through the drive unit 1004) a blower to blow the lid out of the conveyor belt 2030.

In some embodiments, the printing section 2040 and the recording section 2050 may be combined. In some embodiments, the printer 2041 and the input device 2051 may be arranged together, and the printer 2042 and the input device 2052 may be arranged together. In some embodiments, the printer 2041 and the input device 2051 may be integrated, and the printer 2042 and the input device 2052 may be integrated.

In some embodiments, one surface of a lid is printed with an identification by the printer 2041, and the identification printed with the printer 2041 is subsequently recorded by the input device 2051; the other surface of the same lid is printed with an identification by the printer 2042, and the identification printed with the printer 2042 is subsequently recorded by the input device 2052.

The production apparatus 2000 includes a filling and capping section 2060. The filling and capping section 2060 may include a clamper 2061. The clamper 2061 may act as a filler and a capping device. The clamper 2061 fills content into a container 2062 and secures a lid 2011 to the container 2062.

In some embodiments, the production apparatus 2000 may not include the filling and capping section 2060. In some embodiments, the production apparatus 2000 may include the barrel 2010, the conveyor belts 2020 and 2030, the printing section 2040, and the recording section 2050. In some embodiments, the apparatus 2000 without the filling and capping section 2060 may be combined and used together with other devices or apparatuses having the functions of filling and capping.

Figure 23:
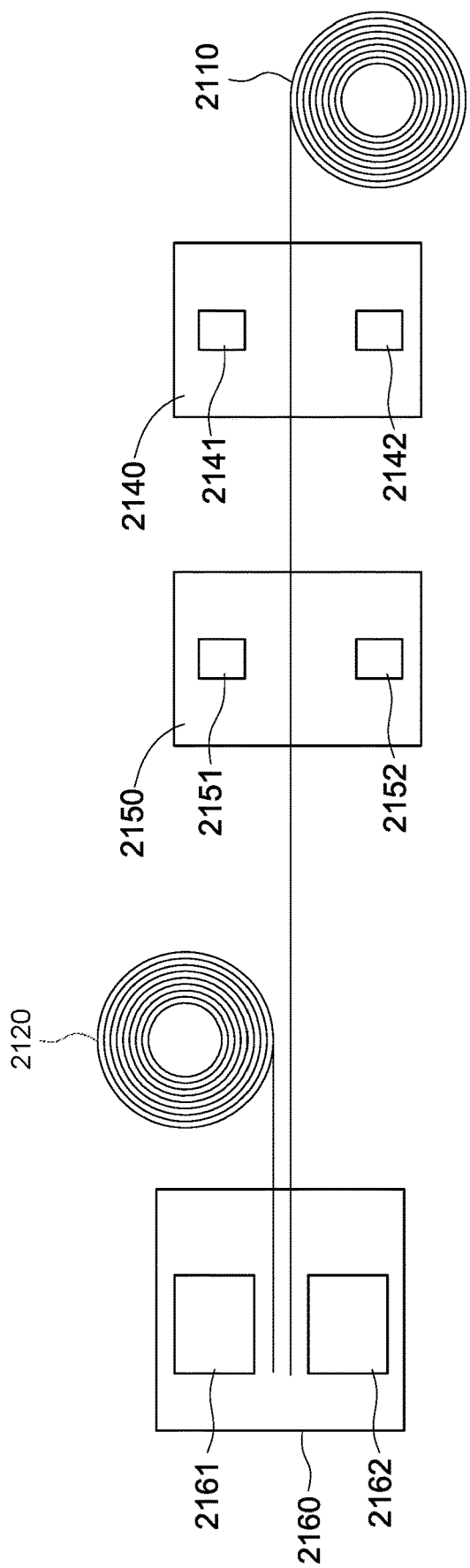
FIG. 23 is a schematic view of a production apparatus according to one embodiment to the present disclosure.

FIG. 23 is a schematic view of a production apparatus 2100 according to one embodiment of the present disclosure. The production apparatus 2100 may be performed to produce the container 300 and content filled therein.

The production apparatus 2100 includes a roll of package paper barrel 2110 and a roll of package paper 2120. The rolls of package paper 2110 and 2120 may contain metal (e.g., aluminum). The container 300 shown in FIG. 4A may be made of the rolls of package paper.

In the apparatus 2100, the roll of package paper 2110 is sent from the right to the left, and the roll of package paper 2120 is sent from the right to the left.

In some embodiments, a position of package paper 2110 or a position of package paper 2120 may be located by counting time differences. In some embodiments, a position of package paper 2110 or a position of package paper 2120 may be located by positioning points on the package paper 2110 and paper 2120 and positioning sensors (e.g., IR sensors or laser sensors). In some embodiments, a position of package paper 2110 or a position of package paper 2120 may be located by positioning sensors and counting time differences.

The production apparatus 2100 includes a printing section 2140. The printing section 2140 includes printers 2141 and 2142. In some embodiments, the printing section 2140 may include positioning sensors (e.g., IR sensors or laser sensors) to locate a position of package paper 2110 (through a positioning point on the package paper 2110).

In some embodiments, the printers 2141 and 2142 may be aligned in position so as to simultaneously print identification on the inner and outer surfaces of a segment of package paper 2110. In some embodiments, the printers 2141 and 2142 may be misaligned in position so as to separately print identification on the inner and outer surfaces of a segment of package paper 2110. The identification printed with the printers 2141 and 2142 may be visible, infrared-visible, or ultraviolet visible.

The production apparatus 2100 includes a recording section 2150. The recording section 2150 includes input devices 2151 and 2152. The input devices 2151 and 2152 may include a camera, an optical scanner, an infrared camera, or an ultraviolet camera. In some embodiments, the printing section 2050 may include positioning sensors (e.g., IR sensors or laser sensors) to locate a position of package paper 2110 (through a positioning point on the package paper 2110).

In some embodiments, the input devices 2151 and 2152 may be aligned in position so as to simultaneously record or capture an image of the identification on the inner and outer surfaces of a segment of package paper 2110. In some embodiments, the input devices 2151 and 2152 may be misaligned in position so as to separately record or capture an image of the identification on the inner and outer surfaces of a segment of package paper 2110.

In some embodiments, the recording section 2150 may perform the function of quality control. In some embodiments, when the system 1000 determines that an identification printed on a segment of package paper 2110 is not identifiable or accessible based on the images provided by the recording section 2150, the system 1000 may instruct (through the drive unit 1004) to discard the segment of package paper 2110.

In some embodiments, the printing section 2140 and the recording section 2150 may be combined. In some embodiments, the printer 2141 and the input device 2151 may be arranged together, and the printer 2142 and the input device 2152 may be arranged together. In some embodiments, the printer 2141 and the input device 2151 may be integrated, and the printer 2142 and the input device 2152 may be integrated.

In some embodiments, one surface of a segment of package paper 2110 is printed with an identification by the printer 2141, and the identification printed with the printer 2141 is subsequently recorded by the input device 2151; the other surface of the same segment of package paper 2110 is printed with an identification by the printer 2142, and the identification printed with the printer 2142 is subsequently recorded by the input device 2152.

The production apparatus 2100 includes a filling and cutting section 2160. The filling and cutting section 2160 may include clamps 2161 and 2162. The clamps 2161 and 2162 may act as a filler, a heater, and a cutting device. The clamps 2161 and 2162 fill content into a container formed by package paper 2110 and 2120 (e.g., the container 300), heating a position of package paper 2110 and 2120, and cutting a segment of package paper 2110 and 2120.

In some embodiments, the production apparatus 2100 may not include the filling and cutting section 2160 and the roll of package paper 2120. In some embodiments, the production apparatus 2100 may include the roll of package paper 2110, the printing section 2040, and the recording section 2050. In some embodiments, the apparatus 2000 without the filling and cutting section 2160 and the roll of package paper 2120 may be combined and used together with other devices or apparatuses having the functions of filling and cutting and providing another roll of package paper.

As used herein, for ease of description, space-related terms such as "under", "below", "lower portion", "above", "upper portion", "lower portion", "left side", "right side", and the like may be used herein to describe a relationship between one component or feature and another component or feature as shown in the figures. In addition to orientation shown in the figures, space-related terms are intended to encompass different orientations of the device in use or operation. An apparatus may be oriented in other ways (rotated 90 degrees or at other orientations), and the space-related descriptors used herein may also be used for explanation accordingly. It should be understood that when a component is "connected" or "coupled" to another component, the component may be directly connected to or coupled to another component, or an intermediate component may exist.

As used in the present invention, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present invention include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

Several embodiments of the present invention and features of details are briefly described above. The embodiments described in the present invention may be easily used as a basis for designing or modifying other processes and structures for realizing the same or similar objectives and/or obtaining the same or similar advantages introduced in the embodiments of the present invention. Such equivalent construction does not depart from the spirit and scope of the present invention, and various variations, replacements, and modifications can be made without departing from the spirit and scope of the present invention.

What is claimed is:

1. A container, comprising:
   a first identification, wherein the first identification is unique for identifying the container, and the first identification is enclosed within the container and in contact with content stored in the container;
   a second identification, wherein the second identification is unique for identifying the container and is accessible, wherein the second identification is different from the first identification, and wherein the second identification is associated with the first identification,
   wherein the container includes a lid, the first identification is disposed on an inner surface of the lid, and the second identification is disposed on an outer surface of the lid.

2. The container of claim 1, wherein the second identification is invisible.

3. The container of claim 1, wherein the first identification is not accessible prior to unpacking the container.

4. The container of claim 1, wherein the first identification and the second identification include a QR code, a barcode, and a serial number.

5. The container of claim 1, wherein an electronic device outputs product information of content in the container by inputting the first identification to the electronic device.

6. The container of claim 5, wherein the product information includes verification information, traceability information, supply chain information, and price information.

7. The container of claim 6, wherein the supply chain information includes one of the factory, the distributor, the wholesaler, and the retailer.

8. The container of claim 1, wherein an electronic device outputs product information of content in the container by inputting the second identification to the electronic device.

9. The container of claim 1, wherein the first identification or the second identification is inputted into an electronic device by any one of a camera, an optical scanner, an infrared camera, and an ultraviolet camera.

10. The container of claim 1, wherein the container is disposed in a package, the package includes a third identification, the third identification is unique for identifying the package, and the third identification is associated with the second identification.

11. A container, comprising:
    a first identification, wherein the first identification is unique for identifying the container, and the first identification is enclosed within the container and in contact with content stored in the container;
    a second identification, wherein the second identification is unique for identifying the container and is accessible, wherein the second identification is different from the first identification, and wherein the second identification is associated with the first identification,
    wherein the container includes a bottle, the first identification is disposed in the bottle, and the second identification is disposed on an outer surface of the bottle.

12. The container of claim 11, wherein the first identification is disposed on an inner surface of the bottle.

13. The container of claim 11, wherein the first identification is not accessible prior to unpacking the container.

14. The container of claim 11, wherein an electronic device outputs product information of content in the container by inputting the first identification to the electronic device, and
    the product information includes verification information, traceability information, supply chain information, and price information.

15. The container of claim 14, wherein the supply chain information includes one of the factory, the distributor, the wholesaler, and the retailer.

16. A container, comprising:
    a first identification, wherein the first identification is unique for identifying the container, and the first identification is enclosed within the container and in contact with content stored in the container;
    a second identification, wherein the second identification is unique for identifying the container and is accessible, wherein the second identification is different from the first identification, and wherein the second identification is associated with the first identification,
    wherein the container includes a bag, the first identification is disposed in the bag, and the second identification is disposed on an outer surface of the bag.

17. The container of claim 16, wherein the first identification is disposed on an inner surface of the bag.

18. The container of claim 16, wherein the first identification is not accessible prior to unpacking the container.

19. The container of claim 16, wherein an electronic device outputs product information of content in the container by inputting the first identification to the electronic device, and
    the product information includes verification information, traceability information, supply chain information, and price information.

20. The container of claim 19, wherein the supply chain information includes one of the factory, the distributor, the wholesaler, and the retailer.

* * * * *